US009406193B2

(12) United States Patent
Brown et al.

(10) Patent No.: US 9,406,193 B2
(45) **Date of Patent: *Aug. 2, 2016**

(54) GAMING SYSTEM AND METHOD PROVIDING A VIDEO POKER GAME WITH COMMUNITY CARDS

(71) Applicant: IGT, Las Vegas, NV (US)

(72) Inventors: Bradford D. Brown, Sparks, NV (US); Ronald P. Papson, Reno, NV (US); David R. Lark, Reno, NV (US); Nicholas B. Mayne, Reno, NV (US); Thomas W. Allen, II, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,573

(22) Filed: Feb. 2, 2016

(65) Prior Publication Data

US 2016/0155291 A1 Jun. 2, 2016

Related U.S. Application Data

(63) Continuation of application No. 14/665,407, filed on Mar. 23, 2015, now Pat. No. 9,269,235, which is a continuation of application No. 13/900,212, filed on May 22, 2013, now Pat. No. 9,011,225.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3227* (2013.01); *G07F 17/3211* (2013.01); *G07F 17/3216* (2013.01); *G07F 17/3293* (2013.01)

(58) Field of Classification Search
USPC .............. 463/1, 11, 12, 13, 20, 25, 30, 39, 42
See application file for complete search history.

(56) References Cited

U.S. PATENT DOCUMENTS

| | | | |
|---|---|---|---|
| 4,651,997 | A | 3/1987 | Wood et al. |
| 4,659,087 | A | 4/1987 | Shen et al. |
| 4,695,053 | A | 9/1987 | Vazquez et al. |
| 4,743,022 | A | 5/1988 | Wood |
| 4,836,553 | A | 6/1989 | Suttle et al. |
| 4,844,464 | A | 7/1989 | Berge |
| 4,948,134 | A | 8/1990 | Suttle et al. |
| 5,019,973 | A | 5/1991 | Wilcox et al. |
| 5,033,744 | A | 7/1991 | Bridgeman et al. |
| 5,098,107 | A | 3/1992 | Boylan et al. |
| 5,100,137 | A | 3/1992 | Fulton et al. |
| 5,154,429 | A | 10/1992 | LeVasseur et al. |

(Continued)

*Primary Examiner* — Adetokunbo O Torimiro

(74) *Attorney, Agent, or Firm* — Neal, Gerber & Eisenberg LLP

(57) ABSTRACT

Various embodiments of the present disclosure are directed to a gaming system and method providing a video poker card game having community cards. Upon receiving a wager, the gaming system provides the player with a quantity of player hands. The gaming system enables the player to discard one or more of the player hands. The gaming system then displays an initial quantity of community cards to the player. The gaming system further enables the player to discard one or more player hands, prior to displaying the remaining community cards. The remaining player hands are each evaluated by combining with the community card against a paytable, to determine an award, if any, won by the player.

20 Claims, 13 Drawing Sheets

(56) References Cited

U.S. PATENT DOCUMENTS

| | | | |
|---|---|---|---|
| 5,167,413 | A | 12/1992 | Fulton et al. |
| 5,174,579 | A | 12/1992 | Griffiths |
| 5,205,555 | A | 4/1993 | Hamano |
| 5,248,142 | A | 9/1993 | Breeding et al. |
| 5,251,897 | A | 10/1993 | Fulton et al. |
| 5,257,789 | A | 11/1993 | LeVasseur et al. |
| 5,275,400 | A | 1/1994 | Weingardt et al. |
| 5,275,416 | A | 1/1994 | Schorr et al. |
| 5,280,915 | A | 1/1994 | Groussman et al. |
| 5,288,081 | A | 2/1994 | Breeding et al. |
| 5,314,193 | A | 5/1994 | Ferrer et al. |
| 5,322,295 | A | 6/1994 | Cabot et al. |
| 5,342,047 | A | 8/1994 | Heidel |
| 5,342,049 | A | 8/1994 | Wichinsky et al. |
| 5,356,140 | A | 10/1994 | Dabrowski et al. |
| 5,374,067 | A | 12/1994 | Jones et al. |
| 5,377,993 | A | 1/1995 | Josephs et al. |
| 5,380,012 | A | 1/1995 | Jones et al. |
| 5,382,025 | A | 1/1995 | Sklansky et al. |
| 5,390,934 | A | 2/1995 | Grassa et al. |
| 5,393,057 | A | 2/1995 | Marnell et al. |
| 5,393,067 | A | 2/1995 | Paulsen et al. |
| 5,411,257 | A | 5/1995 | Fulton et al. |
| 5,411,271 | A | 5/1995 | Mirando |
| 5,431,407 | A | 7/1995 | Hofberg et al. |
| 5,431,408 | A | 7/1995 | Adams et al. |
| 5,437,451 | A | 8/1995 | Fulton et al. |
| 5,437,462 | A | 8/1995 | Breeding et al. |
| 5,452,899 | A | 9/1995 | Skratulia et al. |
| 5,454,570 | A | 10/1995 | Karal et al. |
| 5,494,296 | A | 2/1996 | Grassa et al. |
| 5,529,309 | A | 6/1996 | Bartlett et al. |
| 5,531,440 | A | 7/1996 | Dabrowski et al. |
| 5,531,441 | A | 7/1996 | Dabrowski et al. |
| 5,531,448 | A | 7/1996 | Moody et al. |
| 5,542,669 | A | 8/1996 | Charron et al. |
| 5,544,892 | A | 8/1996 | Breeding et al. |
| 5,570,885 | A | 11/1996 | Ornstein |
| 5,597,162 | A | 1/1997 | Franklin et al. |
| 5,615,888 | A | 4/1997 | Lofink |
| 5,632,485 | A | 5/1997 | Woodland et al. |
| 5,636,842 | A | 6/1997 | Cabot et al. |
| 5,639,088 | A | 6/1997 | Schneider et al. |
| 5,649,705 | A | 7/1997 | String et al. |
| 5,660,391 | A | 8/1997 | Klasee et al. |
| 5,660,393 | A | 8/1997 | Dreger et al. |
| 5,664,781 | A | 9/1997 | Feola et al. |
| 5,673,917 | A | 10/1997 | Vancura et al. |
| 5,678,821 | A | 10/1997 | Hedman et al. |
| 5,685,774 | A | 11/1997 | Webb |
| 5,718,430 | A | 2/1998 | Aramapakul et al. |
| 5,732,950 | A | 3/1998 | Moody et al. |
| 5,735,742 | A | 4/1998 | French et al. |
| 5,755,621 | A | 5/1998 | Marks et al. |
| 5,772,506 | A | 6/1998 | Marks et al. |
| 5,788,574 | A | 8/1998 | Ornstein et al. |
| 5,803,809 | A | 9/1998 | Yoseloff |
| 5,806,846 | A | 9/1998 | Lofink et al. |
| 5,816,575 | A | 10/1998 | Keller et al. |
| 5,820,128 | A | 10/1998 | Brunelle et al. |
| 5,820,460 | A | 10/1998 | Fulton et al. |
| 5,823,873 | A | 10/1998 | Moody et al. |
| 5,823,874 | A | 10/1998 | Adams et al. |
| 5,830,063 | A | 11/1998 | Byrne et al. |
| 5,833,536 | A | 11/1998 | Davids et al. |
| 5,839,730 | A | 11/1998 | Pike |
| 5,845,906 | A | 12/1998 | Wirth et al. |
| 5,848,932 | A | 12/1998 | Adams et al. |
| 5,851,148 | A | 12/1998 | Brune et al. |
| 5,857,678 | A | 1/1999 | Coleman et al. |
| 5,863,041 | A | 1/1999 | Boylan et al. |
| 5,882,259 | A | 3/1999 | Holmes et al. |
| 5,882,261 | A | 3/1999 | Adams et al. |
| 5,890,962 | A | 4/1999 | Takemoto et al. |
| 5,901,958 | A | 5/1999 | Andrews et al. |
| 5,911,418 | A | 6/1999 | Adams et al. |
| 5,911,419 | A | 6/1999 | Delaney et al. |
| 5,934,675 | A | 8/1999 | Handelman et al. |
| 5,941,769 | A | 8/1999 | Order |
| 5,947,820 | A | 9/1999 | Morro et al. |
| 5,947,822 | A | 9/1999 | Weiss et al. |
| 5,951,397 | A | 9/1999 | Dickinson |
| 5,954,335 | A | 9/1999 | Moody et al. |
| 5,957,774 | A | 9/1999 | Holmes et al. |
| 5,967,894 | A | 10/1999 | Kinoshita et al. |
| 5,980,384 | A | 11/1999 | Barrie |
| 5,984,310 | A | 11/1999 | English et al. |
| 6,007,066 | A | 12/1999 | Moody et al. |
| 6,007,424 | A | 12/1999 | Evers et al. |
| 6,012,719 | A | 1/2000 | Webb et al. |
| 6,015,346 | A | 1/2000 | Bennett |
| 6,019,369 | A | 2/2000 | Nakagawa et al. |
| 6,019,374 | A | 2/2000 | Breeding et al. |
| 6,050,895 | A | 4/2000 | Luciano et al. |
| 6,056,641 | A | 5/2000 | Webb |
| 6,059,289 | A | 5/2000 | Vancura et al. |
| 6,062,979 | A | 5/2000 | Inoue |
| 6,089,976 | A | 7/2000 | Schneider et al. |
| 6,089,978 | A | 7/2000 | Adams |
| 6,095,525 | A | 8/2000 | Terminel et al. |
| 6,098,985 | A | 8/2000 | Moody et al. |
| 6,120,031 | A | 9/2000 | Adams et al. |
| 6,120,377 | A | 9/2000 | McGinnis et al. |
| 6,126,541 | A | 10/2000 | Fuchs et al. |
| 6,126,542 | A | 10/2000 | Fier |
| 6,126,547 | A | 10/2000 | Ishimoto |
| 6,131,908 | A | 10/2000 | Palmer et al. |
| 6,135,883 | A | 10/2000 | Hachquet |
| 6,135,884 | A | 10/2000 | Hedrick et al. |
| 6,142,873 | A | 11/2000 | Weiss et al. |
| 6,142,874 | A | 11/2000 | Kodachi et al. |
| 6,155,925 | A | 12/2000 | Giobbi et al. |
| 6,159,097 | A | 12/2000 | Gura et al. |
| 6,159,098 | A | 12/2000 | Slomiany et al. |
| 6,174,233 | B1 | 1/2001 | Sunaga et al. |
| 6,174,235 | B1 | 1/2001 | Walker et al. |
| 6,176,781 | B1 | 1/2001 | Walker et al. |
| 6,179,291 | B1 | 1/2001 | Vancura |
| 6,179,711 | B1 | 1/2001 | Yoseloff |
| 6,189,888 | B1 | 2/2001 | Brunelle |
| 6,190,255 | B1 | 2/2001 | Thomas et al. |
| 6,193,235 | B1 | 2/2001 | Vancura et al. |
| 6,196,547 | B1 | 3/2001 | Pascal et al. |
| 6,206,373 | B1 | 3/2001 | Garrod |
| 6,210,279 | B1 | 4/2001 | Dickinson |
| 6,231,445 | B1 | 5/2001 | Acres |
| 6,234,897 | B1 | 5/2001 | Frohm et al. |
| 6,237,917 | B1 | 5/2001 | Timpano |
| 6,238,288 | B1 | 5/2001 | Walker et al. |
| 6,248,016 | B1 | 6/2001 | Walker et al. |
| 6,257,979 | B1 | 7/2001 | Walker et al. |
| 6,267,669 | B1 | 7/2001 | Luciano, Jr. et al. |
| 6,270,409 | B1 | 8/2001 | Shuster |
| 6,293,866 | B1 | 9/2001 | Walker et al. |
| 6,299,536 | B1 | 10/2001 | Hill |
| 6,305,686 | B1 | 10/2001 | Perrie et al. |
| 6,309,299 | B1 | 10/2001 | Weiss |
| 6,311,978 | B1 | 11/2001 | Moody |
| 6,312,334 | B1 | 11/2001 | Yoseloff |
| 6,332,839 | B2 | 12/2001 | Walker et al. |
| 6,334,613 | B1 | 1/2002 | Yoseloff |
| 6,334,814 | B1 | 1/2002 | Adams |
| 6,336,862 | B1 | 1/2002 | Byrne |
| 6,345,824 | B1 | 2/2002 | Selitzky |
| 6,346,044 | B1 | 2/2002 | McCrea, Jr. |
| 6,347,996 | B1 | 2/2002 | Gilmore et al. |
| 6,358,147 | B1 | 3/2002 | Jaffe et al. |
| 6,371,867 | B1 | 4/2002 | Webb |
| 6,375,189 | B1 | 4/2002 | Jones |
| 6,402,147 | B1 | 6/2002 | Lo |
| 6,402,150 | B1 | 6/2002 | Jones |
| 6,406,023 | B1 | 6/2002 | Rowe |
| 6,413,161 | B1 | 7/2002 | Baerlocher et al. |
| 6,419,578 | B1 | 7/2002 | Moody et al. |

(56) References Cited

U.S. PATENT DOCUMENTS 6,419,583 B1 7/2002 Crumby et al.
6,422,940 B1 7/2002 Walker et al.
6,443,837 B1 9/2002 Jaffe et al.
6,454,266 B1 9/2002 Breeding et al.
6,454,651 B1 9/2002 Yoseloff
6,460,848 B1 10/2002 Soltys et al.
6,461,240 B1 10/2002 Perkins
6,461,241 B1 10/2002 Webb et al.
6,464,582 B1 10/2002 Baerlocher et al.
6,474,645 B2 11/2002 Tarantino
6,474,646 B1 11/2002 Webb
6,481,713 B2 11/2002 Perrie et al.
6,482,089 B2 11/2002 DeMar et al.
6,491,302 B1 12/2002 Boylan et al.
6,503,145 B1 1/2003 Webb
6,511,068 B1 1/2003 Sklansky et al.
6,514,140 B1 2/2003 Storch
6,517,074 B1 2/2003 Moody et al.
6,517,435 B2 2/2003 Soltys et al.
6,523,829 B1 2/2003 Walker et al.
6,523,831 B2 2/2003 Webb
6,530,837 B2 3/2003 Soltys et al.
6,533,658 B1 3/2003 Walker et al.
6,533,662 B2 3/2003 Soltys et al.
6,547,242 B1 4/2003 Sugiyama et al.
6,561,897 B1 5/2003 Bourbour et al.
6,561,898 B2 5/2003 Moody
6,568,680 B1 5/2003 Moody et al.
6,569,014 B2 5/2003 Walker et al.
6,569,015 B1 5/2003 Baerlocher et al.
6,575,830 B2 6/2003 Baerlocher et al.
6,579,180 B2 6/2003 Soltys et al.
6,585,591 B1 7/2003 Baerlocher et al.
6,609,711 B1 8/2003 Campbell
6,626,757 B2 9/2003 Oliveras
6,632,140 B2 10/2003 Berman et al.
6,634,943 B1 10/2003 Baerlocher
6,645,073 B2 11/2003 Lemay et al.
6,648,759 B2 11/2003 Vancura
6,652,377 B1 11/2003 Moody
6,652,378 B2 11/2003 Cannon et al.
6,656,040 B1 12/2003 Brosnan et al.
6,656,047 B1 12/2003 Tarantino et al.
6,659,461 B2 12/2003 Yoseloff et al.
6,672,959 B2 1/2004 Moody et al.
6,682,419 B2 1/2004 Webb et al.
6,682,420 B2 1/2004 Webb et al.
6,692,355 B2 2/2004 Baerlocher et al.
6,702,289 B1 3/2004 Feola
6,726,427 B2 4/2004 Jarvis et al.
6,726,565 B2 4/2004 Hughs-Baird
6,729,620 B2 5/2004 Jones
6,729,961 B1 5/2004 Millerschone
6,733,386 B2 5/2004 Cuddy et al.
6,733,389 B2 5/2004 Webb et al.
6,749,200 B2 6/2004 Yurkins
6,776,415 B2 8/2004 Robinson et al.
6,789,800 B2 9/2004 Webb
6,802,773 B2 10/2004 Moody
6,802,775 B2 10/2004 Baerlocher et al.
6,808,173 B2 10/2004 Snow
6,811,153 B1 11/2004 Ko
6,827,348 B1 12/2004 Mitchell
6,840,517 B2 1/2005 Snow
6,845,981 B1 1/2005 Ko
6,857,958 B2 2/2005 Osawa
6,869,074 B2 3/2005 Miller
6,869,075 B1 3/2005 Stavinsky
6,874,786 B2 4/2005 Bruno
6,877,748 B1 4/2005 Patroni
6,878,064 B2 4/2005 Huang
6,896,265 B1 5/2005 Schlumbrecht
6,902,167 B2 6/2005 Webb
6,913,533 B2 7/2005 Cuddy et al.
6,916,245 B1 7/2005 Vancura et al.
6,923,446 B2 8/2005 Snow
6,935,950 B2 8/2005 Tarantino
6,938,900 B2 9/2005 Snow
6,955,356 B2 10/2005 Moody
6,955,599 B2 10/2005 Bourbour et al.
6,959,928 B2 11/2005 Schultz
6,964,418 B2 11/2005 Moody
6,969,316 B2 11/2005 Jarvis et al.
6,971,955 B2 12/2005 Baerlocher et al.
6,979,263 B2 12/2005 Baerlocher et al.
6,986,514 B2 1/2006 Snow
6,986,710 B2 1/2006 Baerlocher et al.
6,991,538 B2 1/2006 Cannon
6,994,624 B2 2/2006 Gold et al.
6,997,804 B2 2/2006 Berman
7,011,309 B2 3/2006 Soltys et al.
7,014,560 B2 3/2006 Glavich et al.
7,029,395 B1 4/2006 Baerlocher
7,044,468 B2 5/2006 Sklansky et al.
7,056,207 B2 6/2006 Walker et al.
7,056,213 B2 6/2006 Ching et al.
7,059,965 B2 6/2006 Jackson
7,104,886 B2 9/2006 Baerlocher et al.
7,137,628 B2 11/2006 Moody
7,137,630 B2 11/2006 Yurkins
7,153,205 B2 12/2006 Baerlocher
7,156,397 B2 1/2007 Moody et al.
7,156,734 B1 1/2007 Walker et al.
7,160,186 B2 1/2007 Cuddy et al.
7,165,770 B2 1/2007 Snow
7,195,244 B1 3/2007 Feola
7,201,375 B2 4/2007 Adam et al.
7,201,655 B2 4/2007 Walker et al.
7,222,855 B2 5/2007 Sorge
7,222,857 B2 5/2007 Moody
7,222,858 B2 5/2007 Moody
7,246,799 B2 7/2007 Snow
7,247,092 B2 7/2007 Jarvis
7,297,057 B2 11/2007 Gerrard et al.
7,354,344 B2 4/2008 Paulsen et al.
7,371,169 B2 5/2008 Baerlocher
7,404,762 B2 7/2008 Moody
7,416,186 B2 8/2008 Walker et al.
7,419,162 B2 9/2008 Lancaster et al.
7,431,644 B2 10/2008 Moody
7,476,542 B2 1/2009 Walker et al.
7,488,251 B2 2/2009 Kaminkow
7,503,848 B2 3/2009 Berman et al.
7,524,243 B2 4/2009 Bansemer et al.
7,578,737 B2 8/2009 Cregan et al.
7,578,738 B2 8/2009 Cregan et al.
7,614,946 B2 11/2009 Nicely
7,641,197 B2 1/2010 Jackson
7,658,672 B1 2/2010 Wolf et al.
7,674,168 B2 3/2010 Gerrard et al.
7,690,986 B2 4/2010 Ching et al.
7,748,714 B2 7/2010 Nicely et al.
7,749,059 B2 7/2010 Tarantino
7,749,061 B2 7/2010 Walker et al.
7,749,063 B2 7/2010 Belger et al.
7,749,070 B2 7/2010 Baerlocher et al.
7,771,274 B2 8/2010 Walker et al.
7,775,874 B2 8/2010 Ching et al.
7,785,188 B2 8/2010 Cannon
7,803,041 B2 9/2010 Gold et al.
7,803,043 B2 9/2010 Jackson
7,815,500 B2 10/2010 Montross et al.
7,833,095 B2 11/2010 Cuddy et al.
7,837,545 B2 11/2010 Blair, Jr. et al.
7,841,936 B2 11/2010 Berman et al.
7,857,693 B1 12/2010 Johnson et al.
7,862,417 B2 1/2011 Nicely
7,914,369 B2 3/2011 Walker et al.
7,918,724 B2 4/2011 Walker et al.
7,922,571 B2 4/2011 Walker et al.
7,993,191 B2 8/2011 Evans et al.
8,007,357 B2 8/2011 Cuddy et al.
8,137,174 B2 3/2012 Nicely et al.
8,177,615 B2 5/2012 Jackson

(56) References Cited

U.S. PATENT DOCUMENTS

| | | | |
|---|---|---|---|
| 8,333,646 | B2 | 12/2012 | Feola |
| 2001/0000933 | A1 | 5/2001 | Koelling |
| 2001/0035610 | A1 | 11/2001 | Webb |
| 2001/0054796 | A1 | 12/2001 | Lo |
| 2002/0028710 | A1 | 3/2002 | Ishihara |
| 2002/0034974 | A1 | 3/2002 | Wood et al. |
| 2002/0042298 | A1 | 4/2002 | Soltys et al. |
| 2002/0042299 | A1 | 4/2002 | Soltys et al. |
| 2002/0068625 | A1 | 6/2002 | Soltys et al. |
| 2002/0072405 | A1 | 6/2002 | Soltys et al. |
| 2002/0072407 | A1 | 6/2002 | Soltys et al. |
| 2002/0094855 | A1 | 7/2002 | Berman |
| 2002/0173352 | A1* | 11/2002 | Oliveras .............. A63F 3/00157 463/13 |
| 2002/0177480 | A1 | 11/2002 | Rowe |
| 2002/0198036 | A1 | 12/2002 | Baerlocher et al. |
| 2003/0006555 | A1 | 1/2003 | Boylan et al. |
| 2003/0057648 | A1 | 3/2003 | Webb |
| 2003/0064772 | A1 | 4/2003 | Tempest et al. |
| 2003/0064785 | A1 | 4/2003 | Stone et al. |
| 2003/0069064 | A1 | 4/2003 | Ainsworth |
| 2003/0071418 | A1 | 4/2003 | Saucier |
| 2003/0075869 | A1 | 4/2003 | Breeding et al. |
| 2003/0087696 | A1 | 5/2003 | Soltys et al. |
| 2003/0114209 | A1 | 6/2003 | Ritner, Jr. et al. |
| 2003/0144053 | A1 | 7/2003 | Michaelson |
| 2003/0207709 | A1 | 11/2003 | Paotrakul |
| 2003/0211884 | A1 | 11/2003 | Gauselmann |
| 2004/0029631 | A1 | 2/2004 | Duhamel |
| 2004/0070146 | A1 | 4/2004 | Snow |
| 2004/0072619 | A1 | 4/2004 | Brosnan et al. |
| 2004/0152509 | A1 | 8/2004 | Hornik et al. |
| 2004/0164491 | A1 | 8/2004 | Webb |
| 2004/0183256 | A1 | 9/2004 | Ko |
| 2004/0195770 | A1 | 10/2004 | Ornstein |
| 2004/0224777 | A1 | 11/2004 | Smith et al. |
| 2004/0251630 | A1 | 12/2004 | Sines et al. |
| 2005/0012273 | A1 | 1/2005 | Bruno et al. |
| 2005/0026680 | A1 | 2/2005 | Gururajan |
| 2005/0026683 | A1 | 2/2005 | Fujimoto |
| 2005/0029743 | A1 | 2/2005 | Daines |
| 2005/0040599 | A1 | 2/2005 | Snow |
| 2005/0051963 | A1 | 3/2005 | Snow |
| 2005/0054408 | A1 | 3/2005 | Steil et al. |
| 2005/0059461 | A1 | 3/2005 | Ching et al. |
| 2005/0060050 | A1 | 3/2005 | Baerlocher |
| 2005/0073100 | A1 | 4/2005 | Falciglia |
| 2005/0073102 | A1 | 4/2005 | Yoseloff et al. |
| 2005/0082758 | A1 | 4/2005 | Sklansky et al. |
| 2005/0107148 | A1 | 5/2005 | Webb |
| 2005/0116414 | A1 | 6/2005 | Yurkins |
| 2005/0127606 | A1 | 6/2005 | Snow et al. |
| 2005/0161882 | A1 | 7/2005 | Miller |
| 2005/0164760 | A1 | 7/2005 | Moody |
| 2005/0170875 | A1 | 8/2005 | Snow |
| 2005/0202863 | A1 | 9/2005 | Macaulay |
| 2005/0269776 | A1 | 12/2005 | Miller |
| 2006/0001211 | A1 | 1/2006 | Lewis et al. |
| 2006/0058082 | A1 | 3/2006 | Crawford et al. |
| 2006/0058083 | A1 | 3/2006 | Crawford et al. |
| 2006/0058084 | A1 | 3/2006 | Crawford et al. |
| 2006/0058085 | A1 | 3/2006 | White et al. |
| 2006/0058086 | A1 | 3/2006 | White et al. |
| 2006/0058087 | A1 | 3/2006 | White et al. |
| 2006/0058088 | A1 | 3/2006 | Crawford et al. |
| 2006/0058089 | A1 | 3/2006 | White et al. |
| 2006/0058090 | A1 | 3/2006 | Crawford et al. |
| 2006/0058091 | A1 | 3/2006 | Crawford et al. |
| 2006/0058092 | A1 | 3/2006 | Crawford et al. |
| 2006/0058093 | A1 | 3/2006 | White et al. |
| 2006/0066052 | A1 | 3/2006 | White et al. |
| 2006/0068498 | A1 | 3/2006 | White et al. |
| 2006/0068865 | A1 | 3/2006 | White et al. |
| 2006/0068866 | A1 | 3/2006 | White et al. |
| 2006/0068868 | A1 | 3/2006 | Crawford et al. |
| 2006/0068869 | A1 | 3/2006 | White et al. |
| 2006/0068870 | A1 | 3/2006 | Crawford et al. |
| 2006/0068879 | A1 | 3/2006 | Crawford et al. |
| 2006/0068899 | A1 | 3/2006 | White et al. |
| 2006/0084505 | A1 | 4/2006 | Yoseloff et al. |
| 2006/0084506 | A1 | 4/2006 | Yoseloff et al. |
| 2006/0117109 | A1 | 6/2006 | Maes |
| 2006/0128455 | A1 | 6/2006 | Bourbour et al. |
| 2006/0128457 | A1 | 6/2006 | Cannon |
| 2006/0131810 | A1 | 6/2006 | Nicely |
| 2006/0135238 | A1 | 6/2006 | Lancaster et al. |
| 2006/0186598 | A1 | 8/2006 | Coussa |
| 2006/0217167 | A1 | 9/2006 | Jubinville et al. |
| 2006/0223605 | A1 | 10/2006 | Pullman |
| 2006/0267285 | A1 | 11/2006 | Webb et al. |
| 2006/0281513 | A1 | 12/2006 | Kirkpatrick |
| 2006/0284376 | A1 | 12/2006 | Snow |
| 2006/0284378 | A1 | 12/2006 | Snow et al. |
| 2007/0054721 | A1 | 3/2007 | Jackson |
| 2007/0054726 | A1 | 3/2007 | Muir et al. |
| 2007/0075494 | A1 | 4/2007 | Abbott |
| 2007/0090600 | A1 | 4/2007 | Adam et al. |
| 2007/0135193 | A1 | 6/2007 | Nicely |
| 2007/0205559 | A1 | 9/2007 | Webb et al. |
| 2008/0020815 | A1 | 1/2008 | Lancaster et al. |
| 2008/0064462 | A1 | 3/2008 | Gerrard et al. |
| 2008/0070674 | A1 | 3/2008 | Lancaster et al. |
| 2008/0076500 | A1 | 3/2008 | Lancaster et al. |
| 2008/0090655 | A1 | 4/2008 | Marks et al. |
| 2008/0102931 | A1 | 5/2008 | Marks et al. |
| 2008/0111309 | A1 | 5/2008 | Nicely et al. |
| 2008/0113704 | A1 | 5/2008 | Jackson |
| 2008/0119257 | A1 | 5/2008 | Stern et al. |
| 2008/0188278 | A1 | 8/2008 | Paulsen et al. |
| 2008/0214255 | A1 | 9/2008 | Jarvis et al. |
| 2009/0005144 | A1 | 1/2009 | Moody |
| 2009/0104962 | A1 | 4/2009 | Nicely et al. |
| 2009/0117959 | A1 | 5/2009 | Nicely |
| 2009/0121434 | A1 | 5/2009 | Baerlocher et al. |
| 2009/0124313 | A1 | 5/2009 | Nicely |
| 2009/0124316 | A1 | 5/2009 | Baerlocher et al. |
| 2009/0124334 | A1 | 5/2009 | Jones et al. |
| 2009/0181743 | A1 | 7/2009 | Bansemer et al. |
| 2009/0305761 | A1* | 12/2009 | Jackson .................... A63F 1/00 463/12 |
| 2010/0004051 | A1 | 1/2010 | Walker et al. |
| 2010/0035676 | A1 | 2/2010 | Nicely et al. |
| 2010/0099480 | A1 | 4/2010 | Caputo |
| 2010/0144415 | A1 | 6/2010 | Wolf et al. |
| 2010/0227661 | A1 | 9/2010 | Walker et al. |
| 2010/0289220 | A1 | 11/2010 | Jackson |
| 2010/0331068 | A1 | 12/2010 | Walker et al. |
| 2011/0003625 | A1 | 1/2011 | Montross et al. |
| 2011/0014963 | A1 | 1/2011 | Walker et al. |
| 2012/0149451 | A1 | 6/2012 | Nicely et al. |
| 2014/0274257 | A1* | 9/2014 | Burnside ............. G07F 17/3293 463/13 |

* cited by examiner

GAMING SYSTEM AND METHOD PROVIDING A VIDEO POKER GAME WITH COMMUNITY CARDS

PRIORITY

This application is a continuation of, and claims priority to and the benefit of, U.S. patent application Ser. No. 14/665,407, which was filed on Mar. 23, 2015, which is a continuation of, and claims priority and benefit of, U.S. patent application Ser. No. 13/900,212, which was filed on May 22, 2013, and issued as U.S. Pat. No. 9,011,225 on Apr. 21, 2015, the entire contents of each of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets five cards dealt face up from a 52 card deck of playing cards. The player can discard none, one, a plurality or all of the five cards. Each discarded card is replaced with another card from the deck. After the replacement, the cards are evaluated for winning combinations. For a five card poker game, there are ten general categories of hands, ranked from highest to lowest, as shown in Table 1 below

TABLE 1

Ranking of Five Card Poker Hands by Category

| Rank | Name | Example |
|---|---|---|
| 1 | Royal Straight Flush | A♣ K♣ Q♣ J♣ 10 ♣ |
| 2 | Straight Flush | K♣ Q♣ J♣ 10♣ 9 ♣ |
| 3 | Four of a Kind | J♣ J♥ J♦ J♠ 3♣ |
| 4 | Full House | A♥ A♦ A♣ 6♦ 6 ♣ |
| 5 | Flush | A♣ J♣ 8♣ 6♣ 2 ♣ |
| 6 | Straight | 8♦ 7♣ 6♠ 5♠ 4 ♣ |
| 7 | Three of a Kind | Q♠ Q♥ Q♦ 6♦ 2 ♠ |
| 8 | Two Pair | 8♦ 8♥ 5♥ 5♣ 2 ♠ |
| 9 | One Pair | K♦ K♠ 8♣ 7♣ 2♥ |
| 10 | High Card | A♥ 10♣ 7♦ 5♠ 3 ♠ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of straight flush, four of a kind, or flush. There are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), Omaha (also called Omaha Hold'em), and Pai-Gow Poker. The variations in these games generally differ in the manner in which cards are dealt and in the manner and frequency in which bets are placed. Various criteria may also be used to determine the winning hand, including highest ranking hand, lowest ranking hand (Low-Ball), and where the high and low hands each win half of the pot (High-Low).

In certain known multiplayer variations of poker, the players play against each other rather than against a dealer or house. In certain of these variations, a round of play begins when each player has placed an initial bet, called the ante, into the pot. The term pot refers to the total accumulation of antes and wagers made during a particular game. However, in other poker variations, such as Texas Hold'em described in further detail below, only two players at a table make the initial bets, commonly referred to as the blinds.

The quantity of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold'em, Five Card Stud and Seven Card Stud, each player is initially dealt two cards. These cards are typically dealt face-down. However, depending on the game, some of the cards may be dealt face-up to the player. For example, in Five Card Stud, each player is initially dealt one card face-up and one card face-down. In Texas Hold'em, each player is initially dealt two cards face-down which are commonly referred to as the hole cards.

For certain poker variations where additional cards are dealt or where cards may be replaced, after the initial deal, a first round of wagering begins, where the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by each remaining player such that each remaining player has wagered the same amount into the pot during the round.

Depending on the variation of poker being player, each game may have only an initial wager or several rounds of wagering, where each round of wagering is generally preceded by dealing one or more cards. If two or more players remain after a particular round of wagering, either more cards are dealt, or there is a race type situation, depending on the game variation being played. A race type situation or a race occurs when two or more players remain in a game after the last round of wagering has been completed for a particular round. A player wins a game of poker either by having the highest ranking hand when a race occurs, or by being the last remaining player in the game after all other players have dropped out or folded. In a race type situation, each player displays the player's hand to the other players so that each player knows what they have and what would need to get to beat their opponents. If two or more players have identically ranked hands that are the highest ranking hands, the pot is split evenly between the tying players.

Of the poker variations mentioned above, Texas Hold 'em is one of the more popular versions. Texas Hold'em is generally a multi-player card game played at a live card table or via a computer-based virtual card table. In one version of a live card table game of Texas Hold'em, only two players at a table make the initial bets, commonly referred to as the blinds. These blinds include a large blind and a small blind, where the large blind is typically twice the value of the small blind. In a blind based game such as Texas Hold'em, all players are initially eligible to receive a hand, even if they did not place the large blind or the small blind. After the players have anted, each player eligible for play is dealt an initial set of cards. Each of the players must match the blinds, raise the blinds or fold. Texas Hold'em includes a designated quantity of community cards (i.e., usually five) that can be used by all of the players in combination with their hole cards. However, in certain variations, there may only be three community cards. In certain Texas Hold'em games, the community cards are dealt over the course of several wagering rounds. For example, the gaming device or dealer deals the flop (i.e., usually three cards), the turn (usually one card), and the river (usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold'em. In other variations of Texas Hold'em, where the quantity of community cards is only three, the flop is a single card rather than three cards.

Texas Hold'em generally requires two or more players. Certain computer-based versions of the game implement virtual players that use computer heuristics to attempt to allow the virtual players to behave like actual human players.

Certain gaming establishments have an interest in being able to leverage the interest in Texas Hold'em by offering a variation of the game that can be played against the house or casino rather than against other players. This may appeal to players who are waiting to get a seat at a standard table, to those who do not believe they have the skill or bankroll to participate in a standard game, or to those players simply looking for an interesting new casino game.

Existing player versus casino games based on Texas Hold'em generally fall into a few different categories. One type of game has the player attempting to achieve a certain hand outcome relative to a pay table, with assorted betting options and/or requirements along the way. Another type of Texas Hold'em game is based on the outcome of the player's hand relative to that of the dealer's hand, with assorted betting options and/or requirements along the way. Some games offer both type of mechanisms, with the main game based on latter category and an optional side bet based on the former category.

However, Texas Hold'em is generally considered to be a game of skill, where skilled players tend to have a statistical and strategic advantage over lesser skilled players. For example, a skilled player is often able to discern visual clues or tells from their opponents that give them certain information about their opponents' hands. Also, a skilled player may be able to calculate the odds of winning a particular hand or the odds of receiving one or more cards that would be required to win. If the skilled player can do both, they have a distinct advantage over a non-skilled player or a player with lesser skills. Accordingly, certain non-skilled players do not enjoy or may be reluctant to play Texas Hold'em against opponents who are highly skilled. Additionally, certain skilled players may seek out a game of poker with non-skilled players to gain an advantage.

A need therefore exists for new and exciting poker games, including a need for new Texas Hold'em poker games where a non-skilled player is at a lesser disadvantage or at no disadvantage from a skilled player. A need exists for poker games where a showdown or race type situation occurs more frequently such that each player can view each of the cards of the other players. Also, a need exists for new Texas Hold'em poker games where the player can play against a dealer hand and not against other players.

SUMMARY

Various embodiments of the present disclosure are directed to a gaming system and method providing a video poker game with community cards. In general, in certain embodiments, on receiving a wager from a player, the gaming system provides a play of a card game in which the gaming system displays a quantity of player hands to the player. Each player hand includes at least two cards selected from one or more virtual decks of playing cards. The gaming system enables the player to discard one or more player hands before displaying a first quantity of community cards to the player. The gaming system then enables the player to discard one or more remaining active player hands before displaying a second quantity of community cards. The gaming system then further enables the player to discard one or more remaining active player hands before displaying a third quantity of community cards. Each of the remaining player hands is evaluated with quantity of the community cards to determine any award. This award is then displayed to the player.

More specifically, in certain embodiments, the gaming system enables a player to place a primary wager for the play of the card game. After receiving the primary wager, the gaming system displays four player hands to the player, each player hand including two cards, and the rank and the suit of each of the cards in the four player hands being displayed to the player. The cards included in each of the player hands are randomly selected from a virtual single deck of 52 playing cards by the gaming system. The gaming system randomly selects five community cards from the same deck of 52 playing cards. The gaming system displays the rank and the suit of three of the five (i.e., the flop) community cards after enabling and causing the player to discard one of the four player hands. The gaming system displays the rank and the suit of the fourth community card (i.e., the turn) after enabling and causing the player to discard one of the three remaining player hands. The gaming system displays the rank and the suit of the fifth community card (i.e., the river) after enabling and causing the player to discard one of the two remaining player hands. The gaming system then determines any award associated with the remaining player hand and the five community cards.

In various embodiments, the gaming system enables a player to make a wager. After receiving the wager, the gaming system displays a quantity of player hands to the player. Each player hand includes at least two cards that are displayed face up to the player (rank and suit visible). The gaming system displays a quantity of community cards face down (rank and suit not visible). The gaming system causes the player to discard at least one player hand before displaying the rank and suit of a first quantity of community cards from the displayed community cards. The gaming system then proceeds in a loop which terminates either when the rank and suit of all the community cards has been displayed to the player or when the player has discarded or folded all but a designated quantity of player hands, such as one player hand. In the loop, the gaming system causes the player to discard at least one player hand from the remaining active player hands and then displays the rank and suit of at least one community card, whose rank and suit has not been previously displayed to the player. After the loop is terminated, the gaming system determines any award available to the player on the basis of the cards in the remaining player hands and the community cards.

Certain embodiments provide any awards associated with each remaining player hand and the community cards. Certain embodiments combine the cards from the two or more player hands and the community cards and provide any award based on the combination or a subset of cards from the combination. Certain embodiments provide for the player to place a wager either at each instance prior to discarding of one or more player hands, or prior to each instance of display of the rank and suit of one or more community cards. Certain embodiments provide the player with a modifier such as a multiplier that increases after the player discards one or more player hands.

It should thus be appreciated that various embodiments of the gaming system and method of the present disclosure provide new and different video poker games, thereby increasing player enjoyment, entertainment, and excitement.

Additional features and advantages are described herein, and will be apparent from, the following Detailed Description and the Figures.

DETAILED DESCRIPTION

Video Poker Game with Community Cards

Various embodiments of the present disclosure are directed to a gaming system and method providing a video poker card game with community cards whereby the player is dealt a quantity of player hands and discards one or more player hands from the quantity of player hands as game play progresses to reveal community cards from a predetermined quantity of community cards. Once all the community cards from the quantity of community cards have been revealed to the player, the gaming system makes a determination if the player is eligible to win any award. The determination is based on an evaluation of the remaining player hands and revealed community cards against a paytable. While the video poker card game of the present disclosure is employed as a primary game in the embodiments described below, it should be appreciated that the video poker game may additionally or alternatively be employed as or in association with a bonus game or a secondary game. Moreover, while any credit balances, any wagers, and any awards are displayed as an amount of monetary credits or currency in the embodiments described below, one or more of such credit balances, such wagers, and such awards may be for non-monetary credits, promotional credits, and/or player tracking points or credits.

Figure 1:
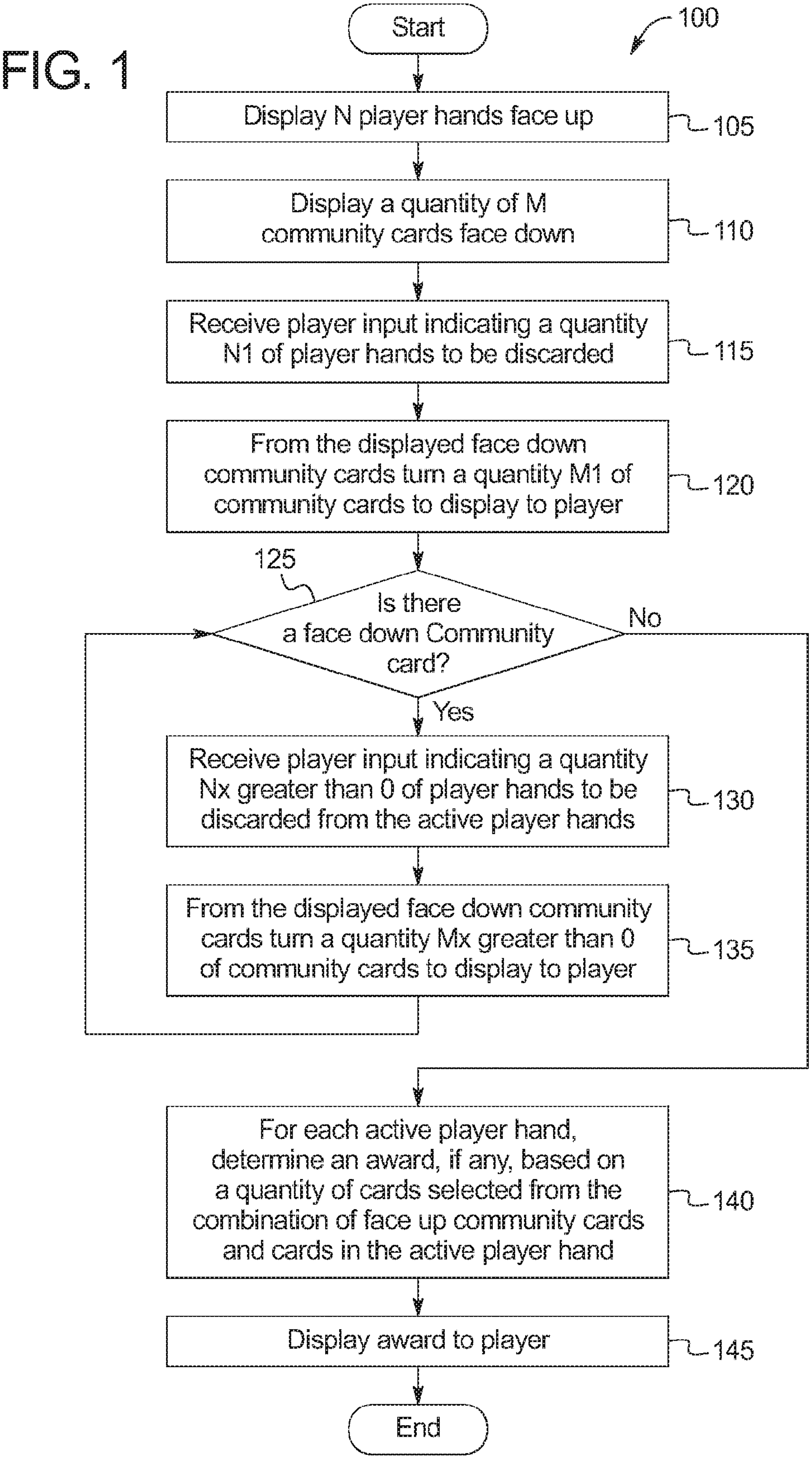
FIG. 1 is a flowchart illustrating a method of operating an example embodiment of a gaming system of the present disclosure.

FIG. 1 is a flowchart of an example process or method 100 of operating a gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

Process 100 depicts various embodiments of operating a gaming system of the present disclosure to provide a play of a video poker card game with community cards to a player. In certain embodiments, the gaming system requires the player to place a wager prior to the initiation of the play of a video poker card game with community cards.

Process 100 starts with a gaming system displaying N player hands, with each hand including a designated quantity of cards, such as at least two cards, as indicated by block 105. The cards in each of the N player hands are displayed face up. The gaming system displays a designated quantity M of community cards to the player face down, as indicated by block 110. The gaming system receives player input that indicates a quantity (N1) of player hands to be discarded or folded, from the N player hands displayed to the player, as indicated by block 115. N1 is less than N, the total hands displayed to the player, thereby leaving the player with a quantity less than N of active or unfolded hands.

The gaming system receives player input in one or more ways. Examples of receiving player input include receiving input from a touch screen of an EGM, such that the player touches one of the four hands on the touch screen enabled EGM. In one example, the EGM has physical buttons or buttons that are displayed by an electronic display device configured to correspond to each of the four hands. The player touches the physical button corresponding to the hand to be discarded. Alternate embodiments provide for the player to touch the player hands or activate the buttons corresponding to the player hands that player wishes to hold. Certain embodiments further enable the player to confirm player choice to hold or discard player hands by a deal, draw, accept or similar input. In various embodiments, the layout of the physical buttons corresponds to the player hands. As an illustration, the left most button corresponds to the left most player hand displayed on the screen, and so on. In one embodiment, where there are five physical buttons, as is customary for traditional video poker games, only four of the five physical buttons are activated. This is also represented by the one inactivated button not being lighted. In other embodiments, the gaming system provides a touch enabled panel in addition to or instead of physical buttons. In other embodiments, the player can move a mouse to position a pointer over the player hand to be discarded or type a keyboard key corresponding to the player hand to be discarded. Alternate embodiments enable a player to move a mouse to position a point over player hands to be held or type keyboard keys corresponding to the player hands to be held.

The gaming system displays the rank and suit of a quantity (M1) of community cards from the M community cards previously displayed to the player, as indicated by block 120. Preferably, M1 is less than M, thereby leaving a quantity less than M of community cards whose rank and suit is not displayed to the player. The gaming system determines if there are any community cards M that are face down, that is, community cards whose rank and suit has not been displayed to the player, as indicated by block 125. At this stage, there should be a quantity of M−M1 community cards that are face down. If this number if greater than zero, the process continues to block 130. Typically, the determination at block 125 will be greater than zero at least once during the execution of the process 100. The gaming system receives player input indicating a quantity Nx of player hands to discard as indicated by block 130. Nx is preferably less than or equal to N−N1 and greater than 0.

The gaming system displays the rank and suit of a quantity (Mx) of community cards from the remaining quantity (M−M1) of community cards whose rank and suit has not been previously displayed to the player, as indicated by block 135. In certain embodiments, Mx is less than or equal to M−M1 and greater than 0. After completion of this step, gaming system then determines if there is a community card from the quantity of community cards whose rank and suit has not been previously displayed to the player, as indicated by block 125, and continues until the gaming system determines that the rank and suit of all M community cards has been displayed to the player. When the rank and suit of all M community cards has been displayed to the player, gaming system determines an award, if any, for each active player hand based on the cards in the player hand and the M community cards displayed to the player, as indicated by block 140. In certain embodiments, the gaming system checks if any one of the following two conditions has been satisfied prior to determining the awards, as indicated by block 140: (a) the rank and suit of all M community cards has been displayed to the player; and (b) the number of active player hands N−N1−Nx falls below or becomes equal to a predetermined quantity, such as one.

The gaming system determines an award, if any, for each active player hand by forming a hand including a predetermined quantity of cards that are selected from the M community cards and the cards forming the active player hand, as indicated by block 140. The predetermined quantity of cards is selected by choosing the combination of cards that provides the highest award to the player. This is done by evaluating all the various possible card combinations from the cards available against a paytable to determine which combination results in the highest award to the player. Table 2 below shows one exemplary paytable that is used in determining the best hand and corresponding award when the predetermined quantity is five. Other variations of paytables with lesser or higher predetermined quantity of cards are contemplated by the present disclosure.

TABLE 2

| Rank | Name | Example | Award value |
|---|---|---|---|
| 1 | Royal Flush | A♠ K♠ Q♠ J♠ 10♠ | 250 |
| 2 | Straight Flush | K♠ Q♠ J♠ 10♠ 9♠ | 50 |
| 3 | Four of a kind | A♠ A♣ A♥ A ♦ 4♦ | 25 |
| 4 | Full House | A♠ A♣ A♥ J♦ J ♠ | 9 |
| 5 | Flush | Q♣ 10♣ 7♣ 6♣ 2♣ | 6 |
| 6 | Straight | 10♣ 9♠ 8♥ 7♥ 6♣ | 4 |
| 7 | Three of a kind | K♥ K♣ K♦ 10♥ 8♦ | 3 |
| 8 | Two pair | K♦ K♠ 9♦ 9♣ 5♠ | 2 |
| 9 | Jacks or better two pair | J♣ J♠ 7♥ 3♦ A♣ | 1 |

Figure 2:
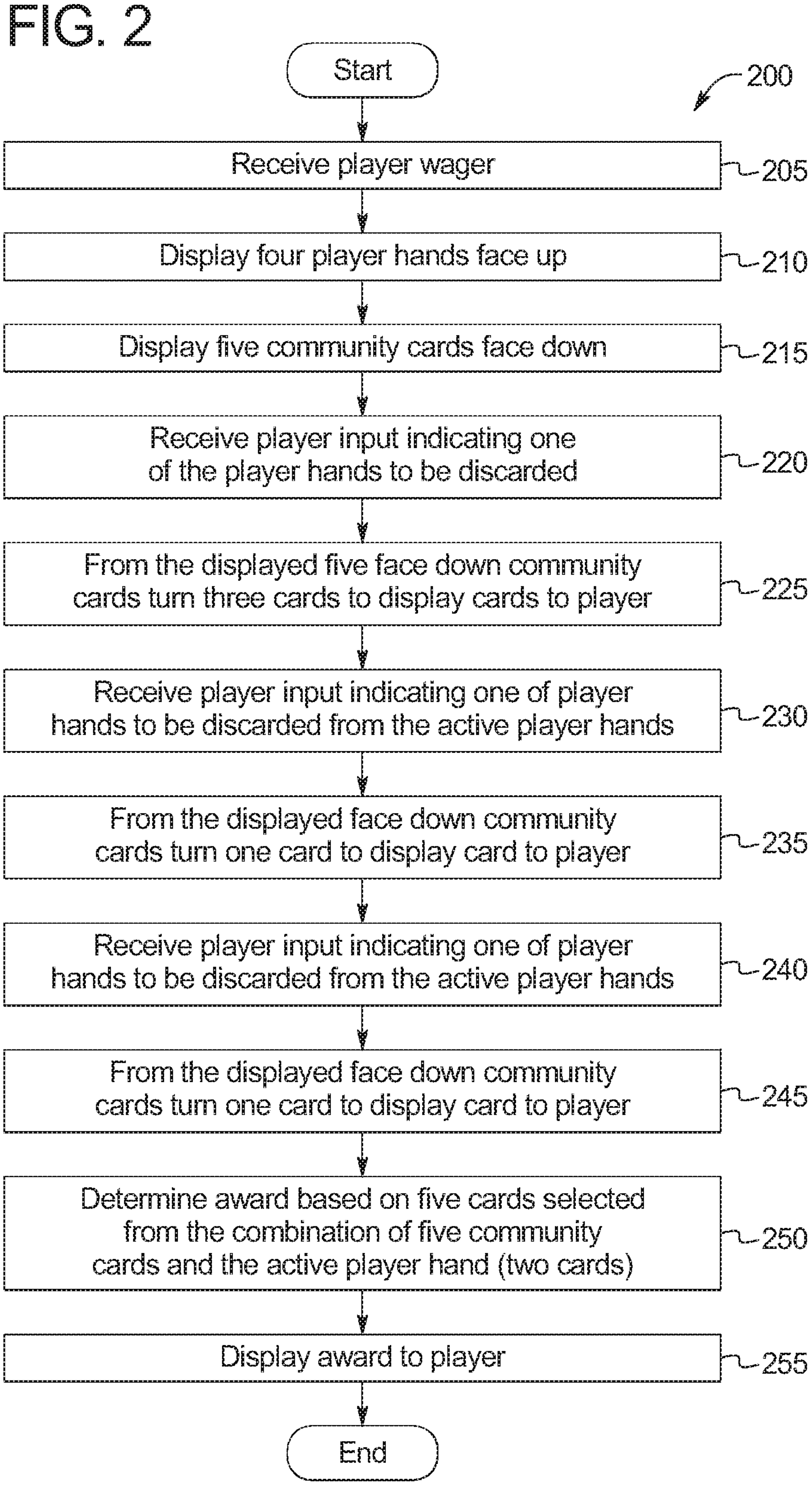
FIG. 2 is a flowchart illustrating a method of operating an example embodiment of a gaming system of the present disclosure.

FIG. 2 is a flowchart of an example process or method 200 of operating a gaming system of the present disclosure. In various embodiments, process 200 is represented by a set of instructions stored in one or more memories and executed by one or more processors. Although process 200 is described with reference to the flowchart shown in FIG. 2, it should be appreciated that many other processes of performing the acts associated with this illustrated process 200 may be employed. For example, the order of certain of the illustrated blocks and/or diamonds may be changed, certain of the illustrated blocks and/or diamonds may be optional, and/or certain of the illustrated blocks and/or diamonds may not be employed.

Process 200 depicts various embodiments of operating a gaming system of the present disclosure to provide a play of a video poker card game with community cards to a player. In certain embodiments, the gaming system requires the player to place a wager prior to the initiation of the play of a video poker card game with community cards. The player is provided a predetermined quantity of player hands that are displayed by the gaming system, each player hand including a predetermined quantity of playing cards. The gaming system enables the player to discard player hands prior to displaying or revealing the player community cards. As the play progresses, the player discards more player hands to display or reveal community cards, until all the community cards are displayed or revealed.

In certain embodiments, each player hand includes two cards dealt to the player from a standard virtual deck of 52 playing cards. All cards in this embodiment are dealt from a virtual deck of 52 playing cards.

The gaming system receives a wager from a player, as indicated by block 205. The gaming system then displays four player hands as indicated by block 210. The player hands are dealt face-up, that is, the card suit and rank are visible to the player, as opposed to being dealt face-down, where the player cannot see the card suit and rank. The four player hands are randomly drawn from the virtual deck of 52 playing cards and respectively form the initial player hands.

The gaming system displays five community cards to the player face down, as indicated by block 215. These cards are also randomly drawn from the same virtual deck of 52 playing cards as the four player hands. Since these cards are dealt face down, the player does not know the suit and rank of these community cards at this point in the game. In certain embodiments, the game system displays the five community cards face down prior to displaying the four player hands, thereby selecting the community cards from the virtual deck prior to the selection of the four player hands. In certain other embodiments, the gaming system displays certain of the community cards face down prior to displaying the four player hands and then displaying the other community cards face up as the player discards player hands, even though the community cards are selected from the virtual deck prior to the selection of the player hands from the virtual deck. In certain embodiments, the gaming system burns one or more cards before selecting the community card from the virtual deck. “Burning” a card refers to the common practice of discarding a card from the deck of cards before selecting a community card. The gaming system may optionally display the burned card to the player.

The gaming system receives input from the player indicative of one of the four initial player hands to be discarded by the player, as indicated by block 220, thereby leaving the player with three non-discarded or active hands. In other words, this represents the player holding three hands and folding the fourth hand. The gaming system flips or turns over three of the five community cards from face down to face up position, as indicated by block 225, thereby revealing the rank and suit of the three community cards to the player. This leaves two of the community cards in the face down position.

In another embodiment, the gaming system is configured to skip the display of five community cards in face down position as indicated by block 215, and display three community cards face up, as indicated by block 225, without ever displaying the five community cards face down to the player.

The gaming system receives input from the player indicative of one of the three player hands from the active player hands to discard, thereby leaving the player with two active hands, as indicated by block 230. The gaming system switches a fourth card from five community cards from face down to face up position, thereby revealing the rank and suit of the fourth community card, as indicated by block 235. After the completion of this block 235, four of the five community cards are face up.

The gaming system receives input from the player indicative of one of the two player hands of active player hands to discard, thereby leaving the player with one active hand, as indicated by block 240. The gaming system flips or turns over the fifth final card from five community cards from face down to face up position, thereby revealing the rank and suit of the fifth community card, as indicated by block 245. After the completion of this block 245, all of the five community cards are face up.

The gaming system determines an award based on a hand including five cards that are selected from the five face up community cards and the two cards in the only remaining active player hand, as indicated by block 250. The gaming system selects the five best cards from these seven cards that provide the highest award to the player. This is done in certain embodiments by evaluating all the various possible five card combinations from the seven cards available against a paytable to determine which combination results in the highest award to the player. Table 2 above shows one exemplary paytable that is used in determining the best hand and corresponding award.

Other variations of the paytable can be employed in accordance with the present disclosure, whereby the gaming system chooses the best hand in a different way, such as in a game where cards with the face value "2" are wild and substitute for any other card in the deck.

The gaming system displays the award determined by the gaming system, as indicated by block 255. In certain embodiments, the process 200 of operating the gaming system is initiated when a player makes a wager. The gaming system accepts a wager by enabling one or more wagers, bets, or other buttons to be activated by a player. To make a wager, the player is required to deposit currency at the gaming system, or establish an account that will enable the player to wager on the gaming system. After the award is displayed to the player, the gaming system provides the award to the player by incrementing the credit meter on the player's EGM, or providing player credits representing the award won, or other similar mechanisms. These credits can be later cashed out by the player if the credits represent a monetary value. At this point, the player may choose to begin another wager cycle and the process may start all over again using a new deck of 52 virtual playing cards.

Figure 3A:
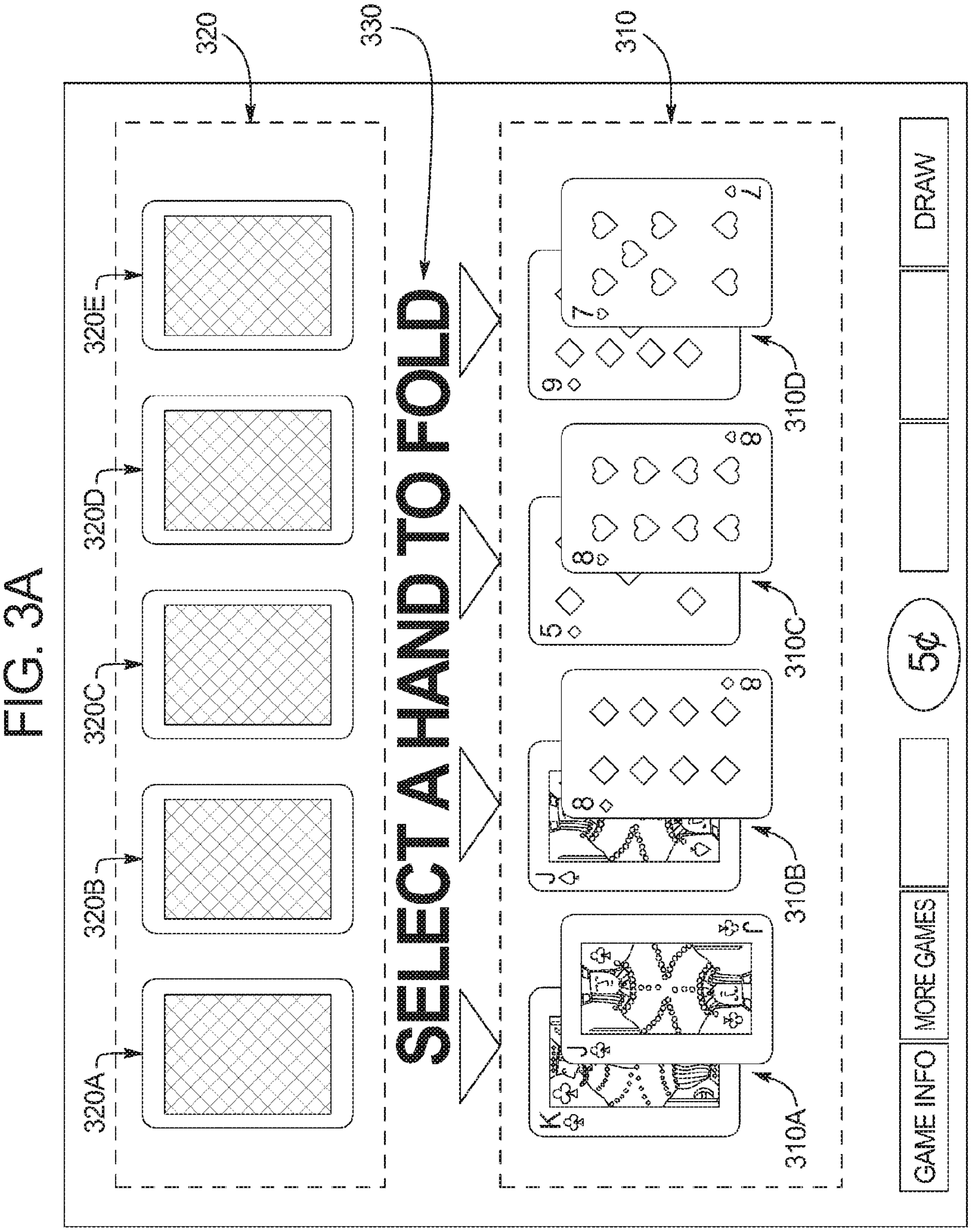
FIGS. 3A, 3B, 3C, 3D, 3E, 3F, and 3G illustrate screen shots of the gaming system of the present disclosure operating an example of the video poker gaming of the present disclosure according to the method of FIG. 2.

FIGS. 3A, 3B, 3C, 3D, 3E, 3F, and 3G illustrate screen shots of one embodiment of the gaming system of the present disclosure operating an example of the video poker card game of the present disclosure according to the method of FIG. 2. FIG. 3A shows four player hands 310A, 310B, 310C, and 310D, collectively 310, displayed to the player face up. Each player hand 310 includes two cards selected from a standard virtual playing card deck of 52 cards. The figure also shows five community cards 320A, 320B, 320C, 320D, and 320E, collectively 320, displayed to the player face down. At this point, the gaming system receives player input indicating one of the player hands to be discarded. In various embodiments, this is achieved by enabling the player to activate a touch screen at a position corresponding to the hand to be discarded. In other embodiments, this is achieved via an input device such as a mouse or a keyboard. In other embodiments, this is achieved by the player activating a physical or virtual button on the gaming system corresponding to the hand to be discarded. In certain embodiments, the gaming system displays a prompt 330 to the player.

Figure 3B:
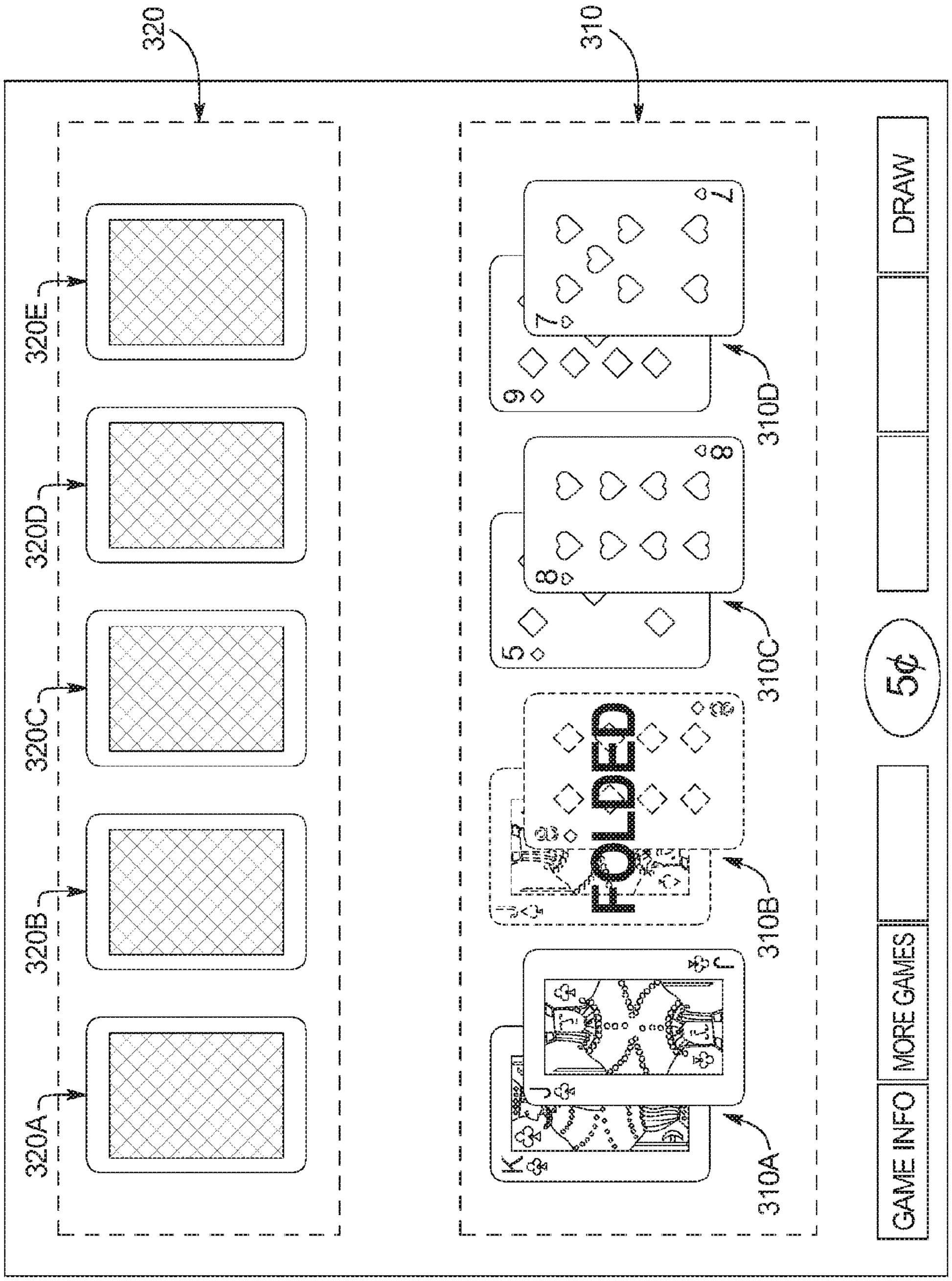

After the gaming system receives the player input indicative of the player hand 310B to be discarded, the hand is then marked as discarded, as shown in FIG. 3B. Player hands may be marked as discarded by graying them out as shown in FIG. 3B or by placing an X over them, or by other suitable methods. At this stage, player hands 310A, 310C, and 310D are active.

Figure 3C:
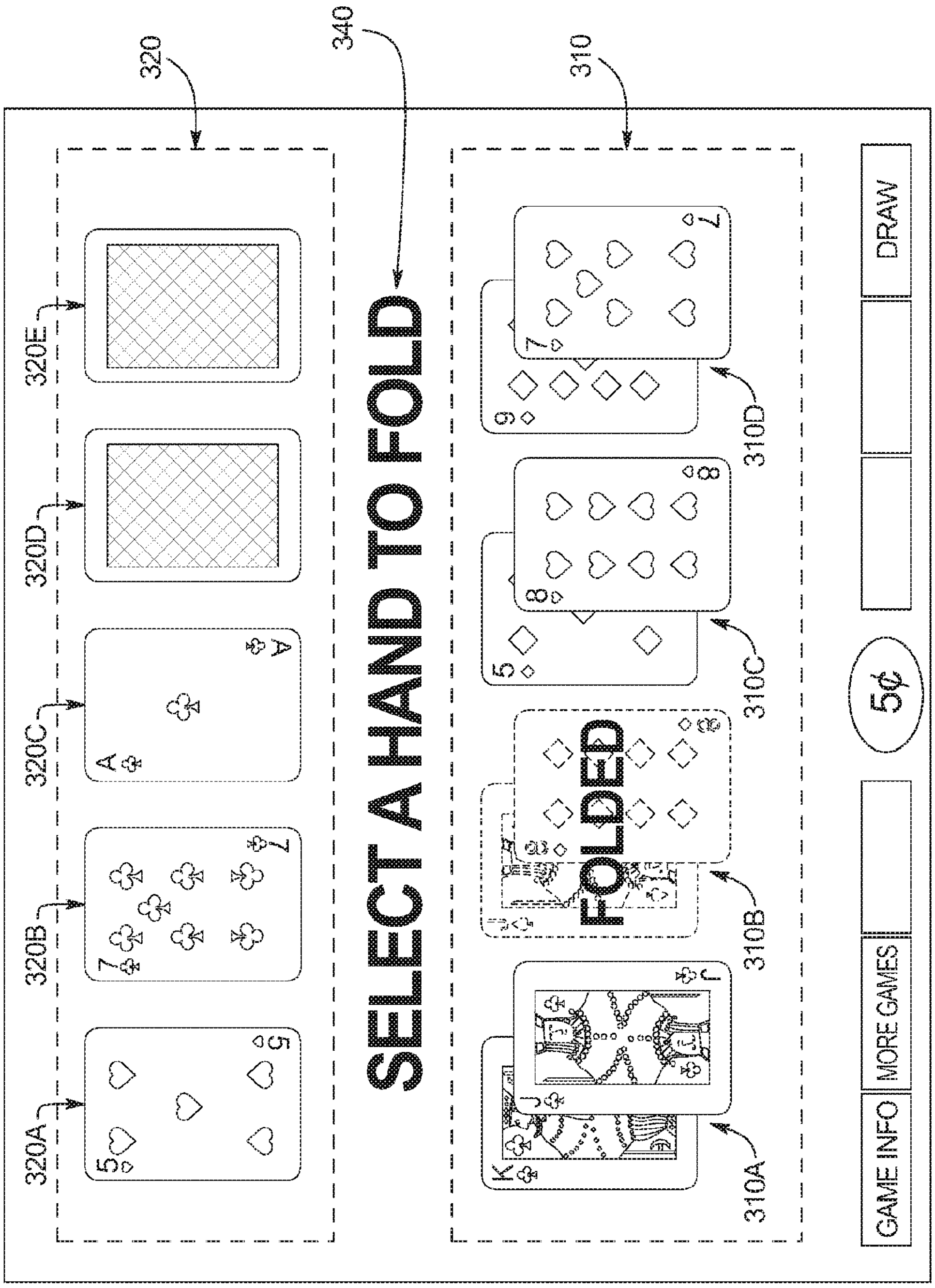

FIG. 3C shows the three of the five community cards being turned over. Here, community cards 320A, 320B, and 320C are turned over so that their rank and suit are visible to the player. The gaming system receives player input indicative of a player hand to be discarded. As depicted in FIG. 3C, the player can choose to discard only the currently active hands. In this example, the player can only choose from hands 310A, 310C, and 310D. The player cannot choose player hand 310B since player hand 310B was previously discarded. In certain embodiments, the gaming system displays a prompt 340 to the player indicating to the player that the gaming system is awaiting player input, such as the message "SELECT A SET TO DISCARD" shown in FIG. 3C.

Figure 3D:
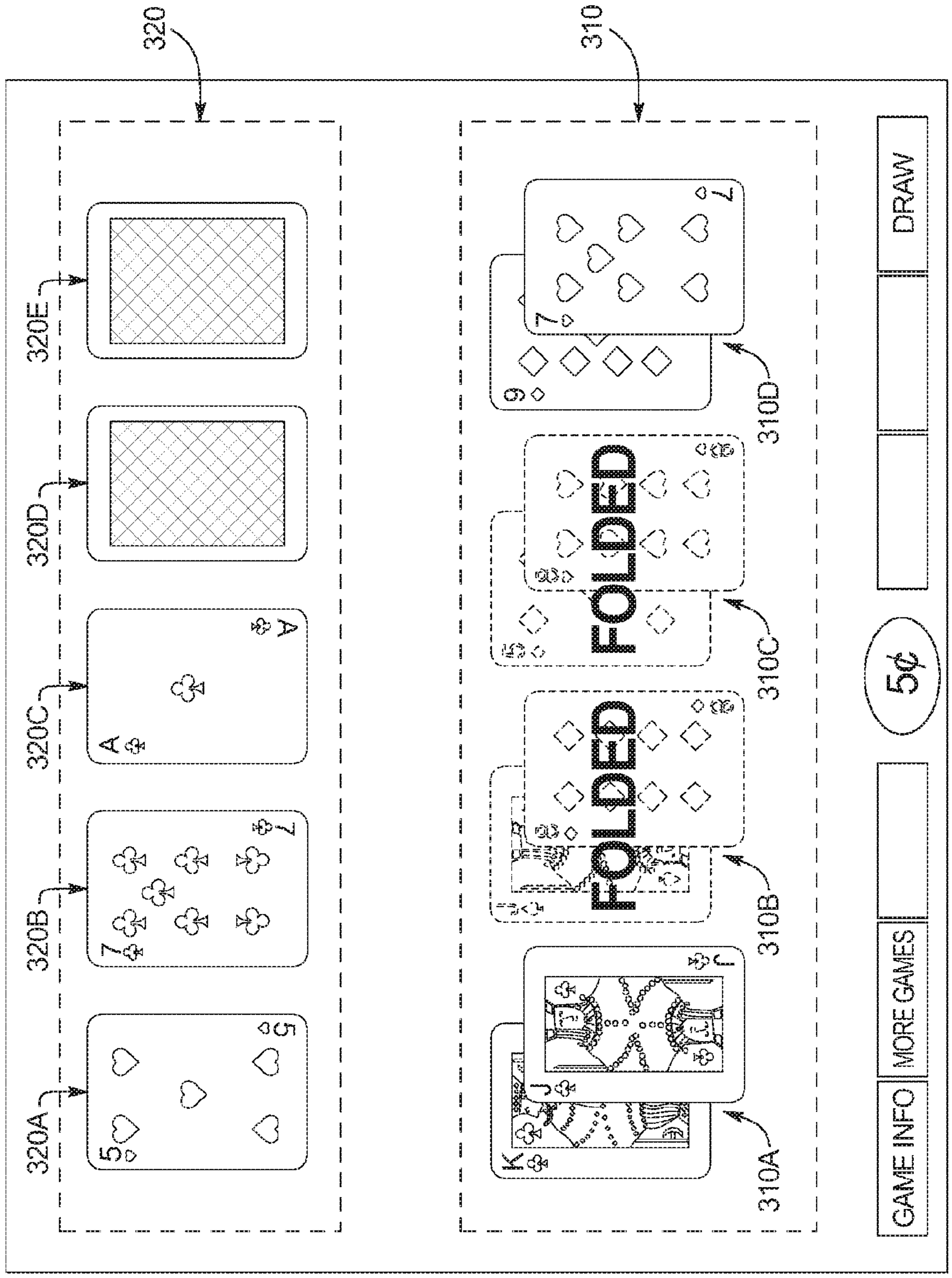

After the gaming system receives the player input indicative of the player hand 310C to be discarded, the player hand 310C is then marked as discarded, as shown in FIG. 3D, thereby leaving player hands 310A and 310D as the only active hands.

Figure 3E:
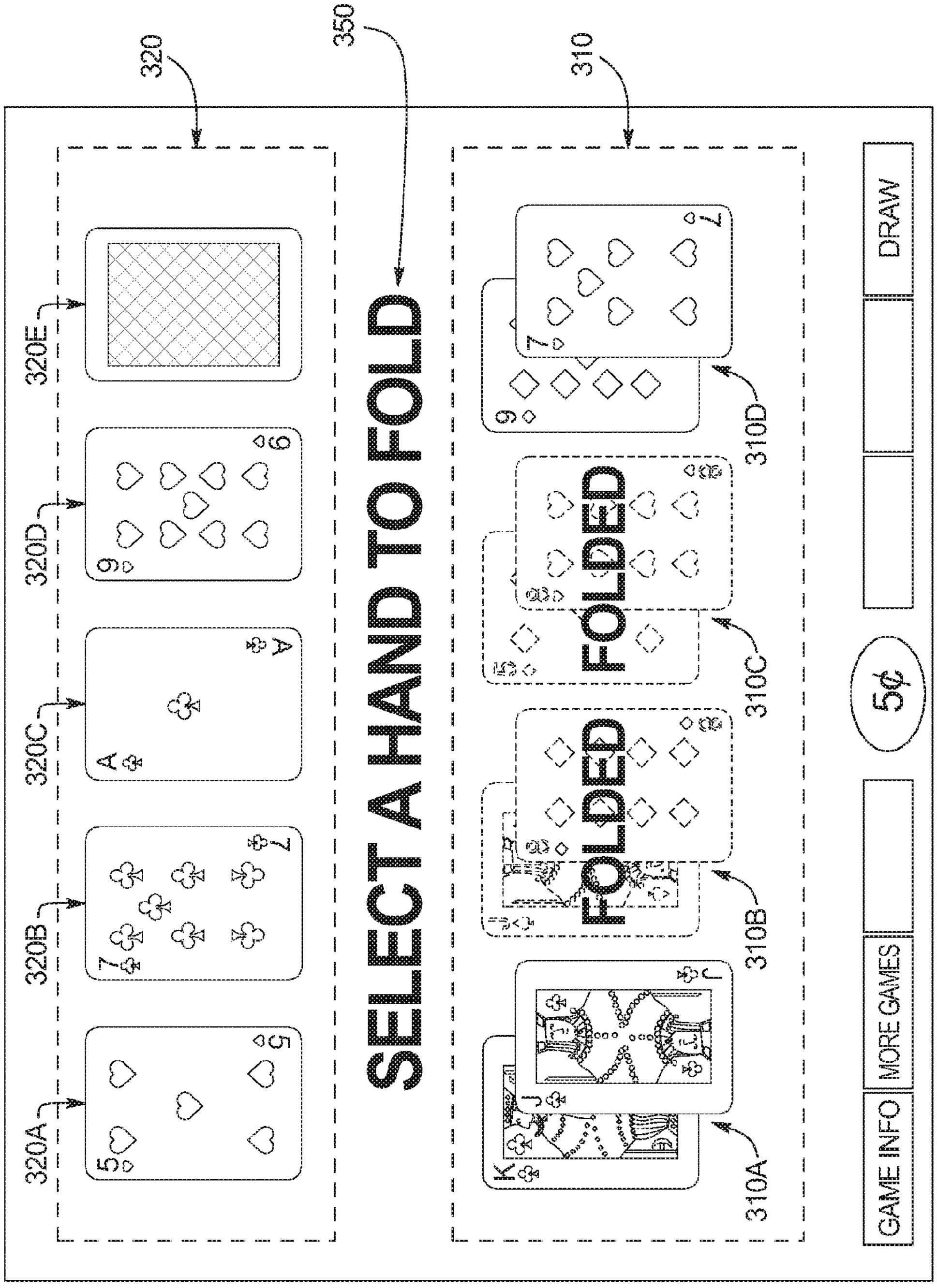

FIG. 3E shows the one of the two face down community cards 320 having been turned over. Community cards 320A, 320B, and 320C were previously turned over so that their rank and suit are visible to the player. This figure depicts community card 320D being turned over by the gaming system so that its rank and suit are visible to the player. The gaming system receives player input indicative of a player hand to be discarded. As shown in FIG. 3E, the player can choose to discard only the previously active hands. In this example, the player can only choose from hands 310A and 310D. The player cannot choose player hands 310B or 310C since player hands 310B and 310C were previously discarded. In certain embodiments, the gaming system displays a prompt 350 to the player indicating to the player that the gaming system is awaiting player input.

Figure 3F:
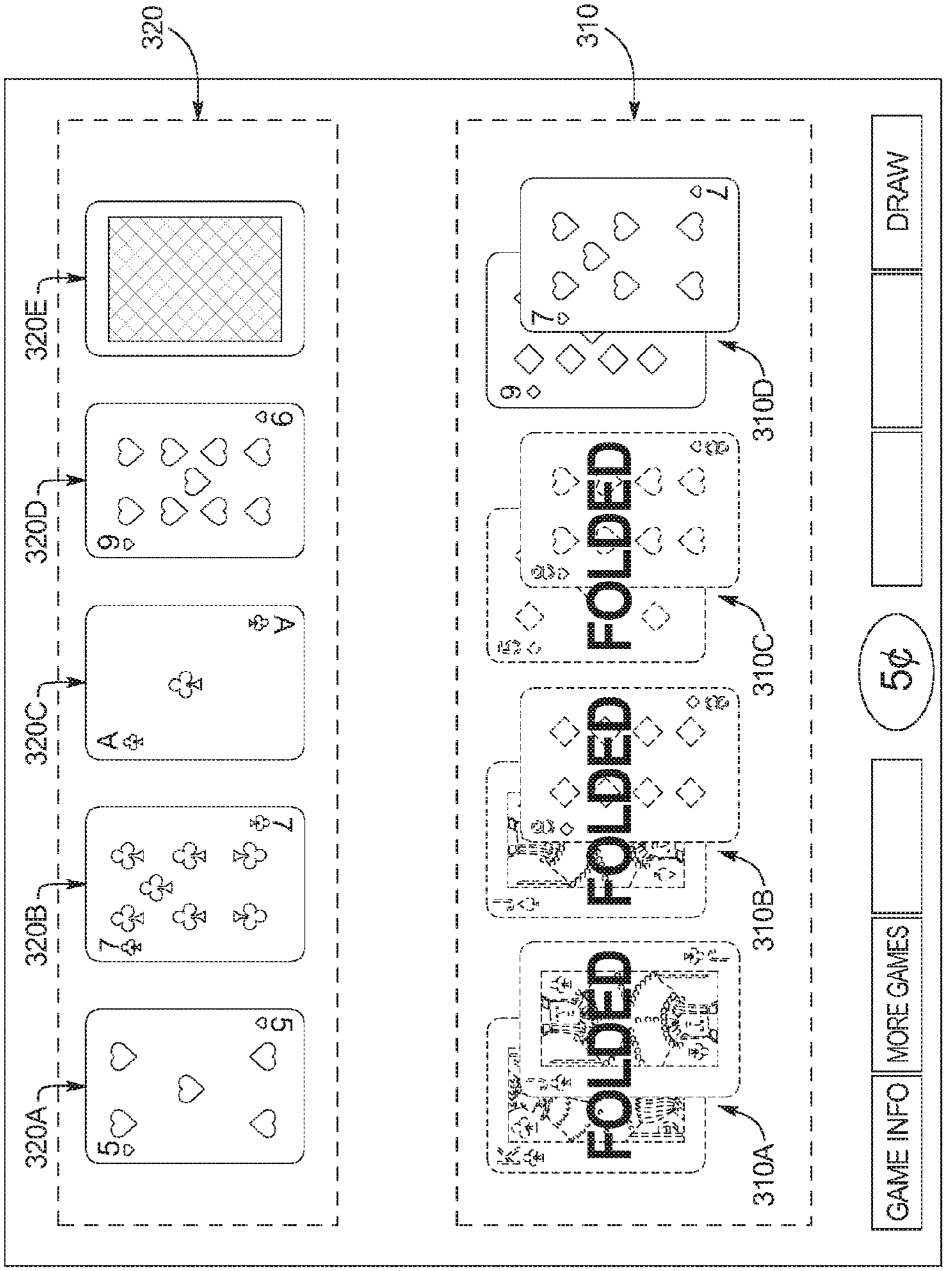
Figure 3G:
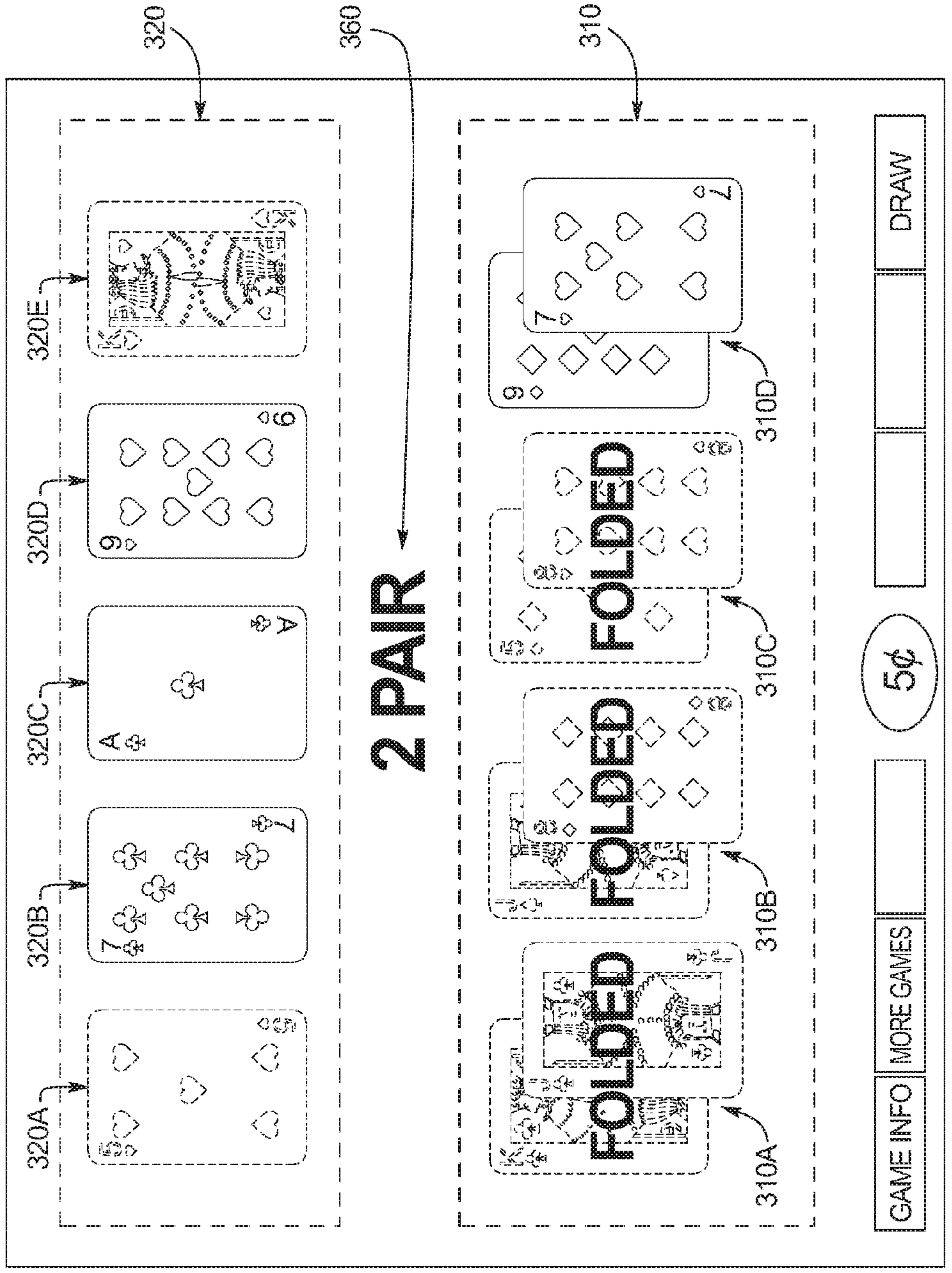

After the gaming system receives the player input indicative of the player hand 310A to be discarded, the player hand 310A is then marked as discarded, as shown in FIG. 3F. FIG. 3G depicts the remaining face down community card 320E being turned over by the gaming system. Community cards 320A, 320B, 320C, and 320D were previously turned over so that their rank and suit are visible to the player. Community card 320E is turned over so that its rank and suit are visible to the player.

At this stage, all the five community cards 320 have been turned over, and their respective ranks and suits are visible to the player. Further, the player has discarded three player hands, 310A, 310B and 310C of four player hands 310, leaving the player with one active player hand 310D. The gaming system then evaluates a best hand by selecting five cards from the group of five community cards 320 and the two cards in player hand 310D. The gaming system determines that the best hand possible is a two pair and selects community cards 320B and 320D, both the cards from player hand 310D and 320C as the remaining high card. It should be appreciated that in certain embodiments, the gaming system selects just one of the two cards from player hand 310 and is not restricted to selecting either both or none of the cards from a player hand 310. The best five card combination may be formed by selecting all five community cards 320 and no card from player hand 310. In other embodiments, the best hand may be formed by selecting only one card from a player hand 310 and the remaining four cards from community cards 320. As shown in FIG. 3G, the gaming system displays a message 360 indicating to the player the best hand selected. Further, in this example, the best hand is indicated by fading the cards that were not included in the best hand. In this case, cards 320A and 320E have been grayed out to indicate they were not selected for inclusion in the best hand. In various embodiments, the gaming system uses a paytable to determine an award, if any, which is to be provided to the player. The award may further be varied by multiplying it with the amount of the player's wager to enable those players who place a higher wager to win a higher payout. Alternatively, the player with a higher wager amount is provided a different paytable than the player with a lower wager amount. This award amount may then be displayed to the player.

In certain embodiments, the gaming system operates in a way that requires a player to place a wager prior to the execution of any of the steps described above. For example, the player is required to place a wager prior to the gaming system executing step 210, as described in FIG. 2. In certain embodiments, the player is required to place a second wager either prior to discarding one or more player hands or prior to the display of rank and suit of one or more community cards. For example, the player is required to place a second wager prior to steps 230 or 235 as shown in FIG. 2. In certain embodiments, the player is also required to place a third wager either prior to steps 240 or 245. In certain other embodiments, the player is required to place a wager simultaneous to the player discarding one or more of the player hands, or simultaneous to the gaming system turning one or more face down community cards face up. In other embodiments, the player may be given the option to increase the initial wager at various stages of play of the game.

In certain embodiments, the gaming system requires the player to place a wager on some or all of the initial player hands prior to the display of the initial player hands to the player by gaming system. In these embodiments, the gaming system enables the player to withdraw wagers from the player hands that the player wishes to discard and maintain the initial wager on the player hands the player wishes to remain active.

In certain embodiments, the player is provided with a modifier such as a multiplier that is increased at each stage of the game. For example, the player is provided with a 1× multiplier with the first wager prior to block 110. When the player chooses to discard one of the player hands, the player's multiplier is increased by either a predetermined amount, or an amount determined based on at least a probability of the player achieving a winning hand and any payout associated with such a winning hand. This multiplier then increases at every instance the player discards one or more player hands, either by a predetermined amount, or an amount determined by the gaming system based on at least a probability of the player achieving a winning hand and any payout associated with such winning hand.

In certain embodiments, all the cards forming the player hands and the community cards are selected from a single virtual deck of 52 playing cards. In other embodiments, these are selected from multiple virtual decks of 52 playing cards. In certain embodiments, the virtual deck of playing cards includes additional cards such as one or more wild cards such as a joker.

In certain embodiments, the gaming system enables the player to place additional wagers on certain player hands. For example, if one of the player hands includes two aces, the player is provided an opportunity to place an additional wager on that hand. However, if the player later decides to discard that particular hand, then the player may lose the opportunity to withdraw such additional wager and win an award based on the additional wager. In certain embodiments, the gaming system enables the player the additional wager based on certain criterion. In other embodiments, the player can place the additional wagers at one or more predetermined events, such as prior to display of the community cards, or prior to each time one or more community cards are turned over.

In certain embodiments, the gaming system enables the player to place individual wagers on each player hand. The gaming system enables the player to vary the wager, such that the amount on one player hand is different than the amount wagered on another player hand. Further, the gaming system enables the player to place additional wagers after one or more community cards are displayed to the player by the gaming system. For example, the player may place a higher wager on one player hand and a lower wager on a second player hand prior to the display of any community cards. After a first quantity of community cards have been displayed by the gaming system, the player may feel that the first hand may not be a winning hand. The gaming system enables the player to place a lower wager on the first hand and a higher wager on the second hand after the display of the first quantity of community cards. In certain of these embodiments, the total amount that can be wagered by the player is restricted to a predetermined amount.

In various embodiments, the gaming system provides a modifier such as multiplier to the player. In certain of these embodiments, the multiplier increases only when the player discards one or more player hands. The multiplier does not change in situations where the player does not discard a player hand. The amount by which the multiplier increases is either predetermined, or determined by the gaming system based on at least a probability of the player achieving a winning hand and any payout associated with such winning hand.

In certain embodiments, the player has more than one hand active after all of the community cards are turned from face down to face up. In certain embodiments, the best hand is selected by the gaming system and a corresponding award, if any, is displayed to the player. In other embodiments, an award, if any, is generated for each active hand that the player holds after all the community cards are turned face up, or displayed to the player.

In various embodiments, the community cards are not displayed face down. Instead, a first set of the community cards are directly displayed face up without ever being displayed face down to the player. In certain embodiments, the gaming system "burns" a playing card prior to the display of the community cards after the initial set of community cards has been displayed to the player or turned face up. In various embodiments where the community cards are displayed to the player as face down, the gaming system selects the sequence of community cards by incorporating the burning of a card in the process of selecting the community cards.

In certain embodiments, the gaming system provides more than a single award to the player. The gaming system provides awards on the basis of one or more of the following combinations: (1) a hand formed by selecting three cards from the set of community cards and the cards forming the player hand; (2) a hand formed by selecting four cards from the set of community cards and the cards forming the player hand; and (3) a hand formed by selecting all cards from the set of community cards and the cards forming the player hand. In certain embodiments, each of the above three combinations is ranked against a different paytable (i.e., combination (1) above is ranked against paytable t1; combination (2) above is ranked against paytable t2; and so on).

In various embodiments, the gaming system enables the player to place a wager on each hand the player wishes to hold (or keep active) at each stage of the play of a game. For example, of the four initial player hands dealt to the player, the player may place a wager on two of the four hands. The two player hands remain active and the other player hands are discarded. After the three community cards are revealed to the player, the player may wish to retain both the hands that were initially held and may place wagers on each of the two hands to do so. When the fourth community card is revealed to the player, the player may decide to only hold one hand and may do so by placing a wager on that hand only, thereby discarding or folding the second hand that was previously held.

In other embodiments, the gaming system enables the player to retain at least two player hands prior to the display of the last community card. In certain embodiments, the gaming system determines an award based on a hand formed by selecting three cards from the five community cards and two cards from the four cards forming the two player hands.

In certain embodiments, each of the player hands is dealt to the player from a separate one or more deck of playing cards. For example, player hand 1 is dealt from deck 1; player hand 2 is dealt from deck 2; and so on. In certain embodiments, the gaming system first selects the five community cards. These five cards are then removed from each of the separate one or more deck of playing cards. After this point, the player is dealt a player hand each from each of the separate one or more deck of playing cards. The gaming system does not display the selected community cards prior to the display of each of the player hands even though the community cards are selected first, in accordance with various of the above described embodiments of the present disclosure.

In certain embodiments, the gaming system deals multiple sets of community cards, with each set corresponding to a player hand. For example, in one of these embodiments, the gaming system deals four player hands and four corresponding sets of community cards. Each set of player hands and community cards is dealt from its individual deck of 52 playing cards. In other embodiments, each set of community cards and player hands is dealt from separate multiple decks of 52 playing cards. Play begins with the gaming system displaying to the player the four player hands face up and four sets of five community cards each face down. The gaming system enables the player to discard one of the four sets of player hands and corresponding community cards, based on the displayed player hands. After receiving the input from the player indicative of the player hand to be discarded, the gaming system discards that player hand and its corresponding community card set.

The gaming system displays three of the five community cards from each of the remaining three sets of community cards to the player. The gaming system then receives player input indicative of one of the three remaining sets of player hands to be discarded. The gaming system discards the player hand indicated by the user input and its corresponding community card set. The gaming system then displays the fourth community card from each of remaining two sets of five community cards to the player. The gaming system receives player input indicative of one of the remaining two sets of player hands to be discarded. The gaming system discards the player hand indicated by the user input and its corresponding community card set, thereby leaving only one set of player hands and community cards. The gaming system displays the fifth community card for the remaining set and determines an award, if any, based on the cards in the player hand and the community cards. The award is displayed to the player by the gaming system. In certain alternate embodiments, the gaming system displays three community cards to the player from each set prior to receiving input from the player indicative of one of the four player hands and its corresponding community card set to be discarded.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 4A:
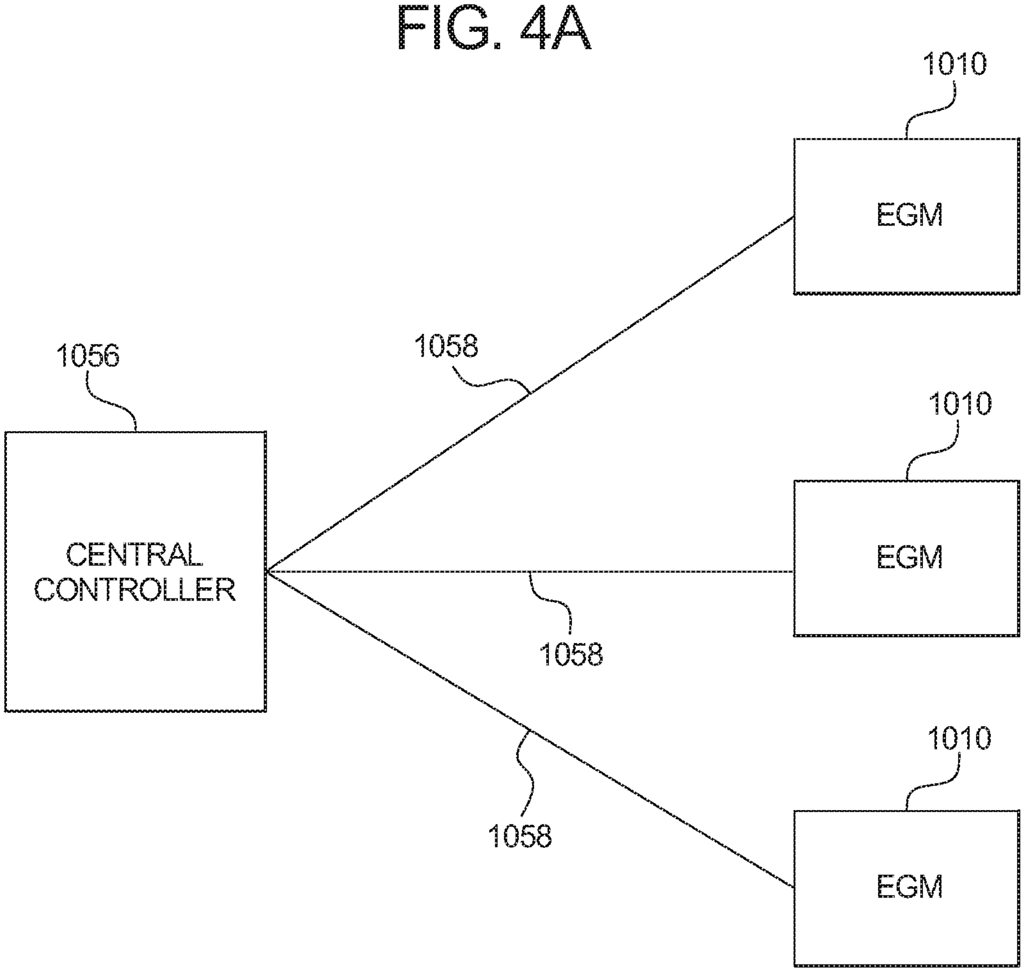
FIG. 4A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 4A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4B:
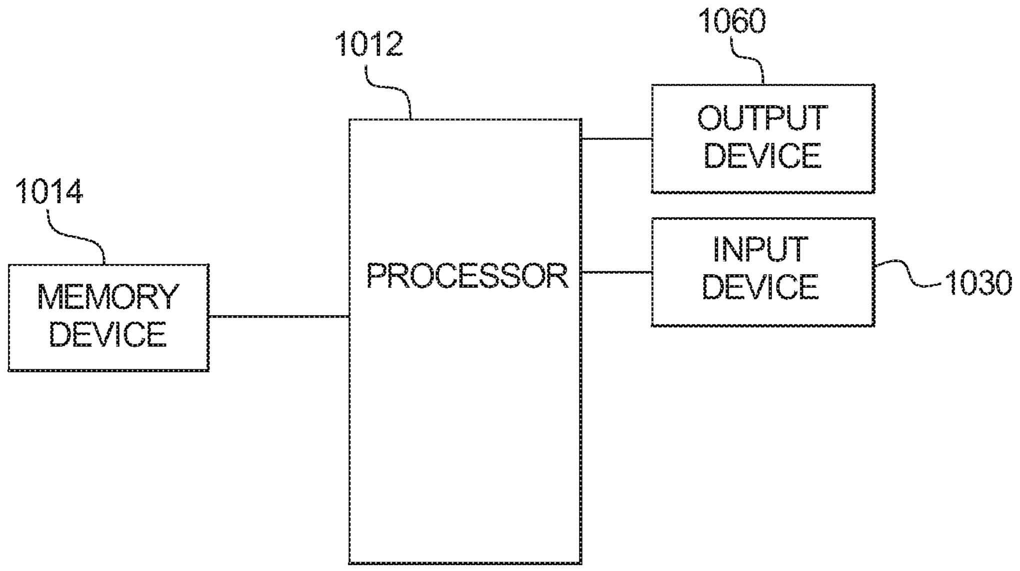
FIG. 4B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 4B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 4B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 5A:
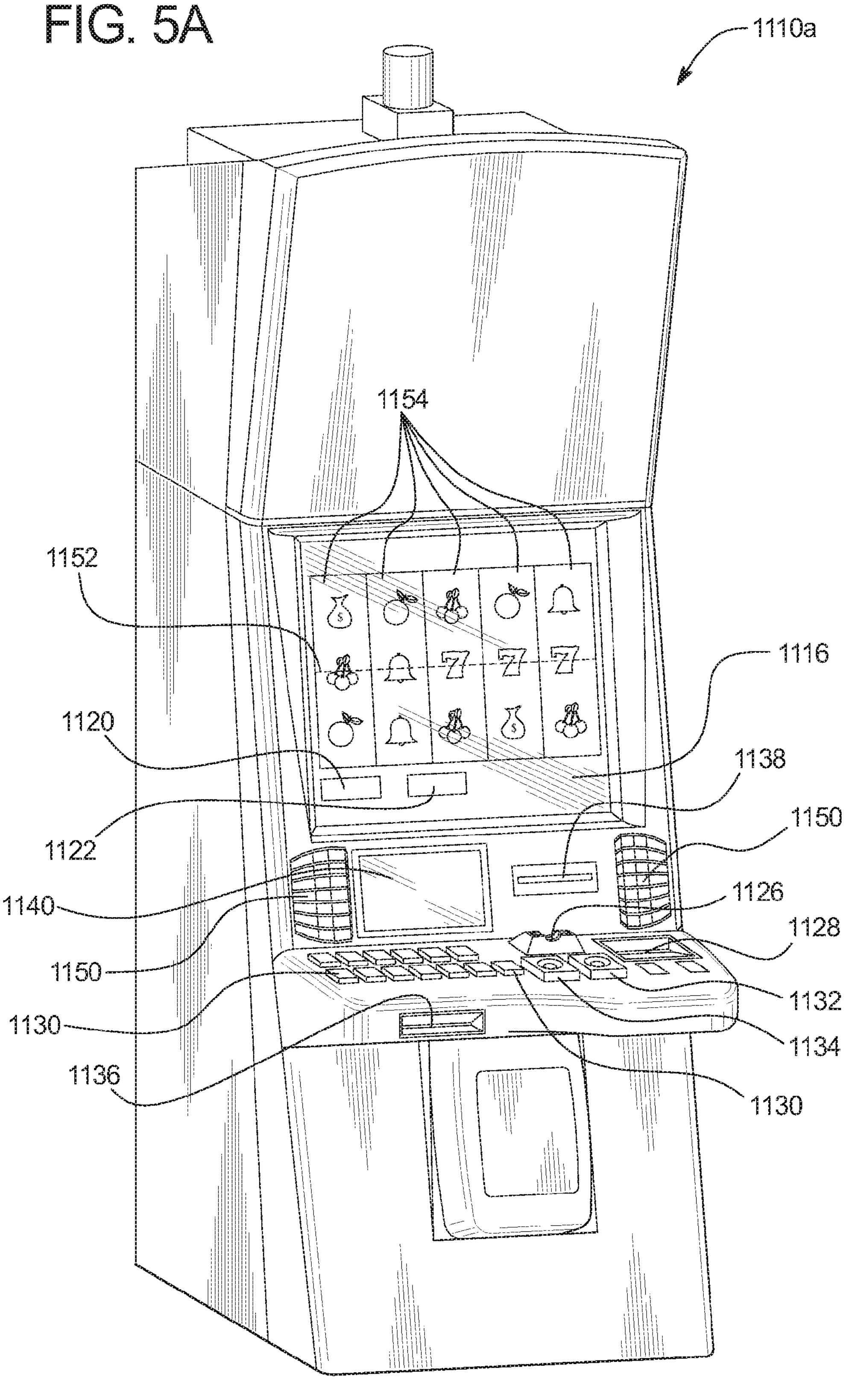
FIGS. 5A and 5B are perspective views of example alternative embodiments of the gaming system of the present disclosure.
Figure 5B:
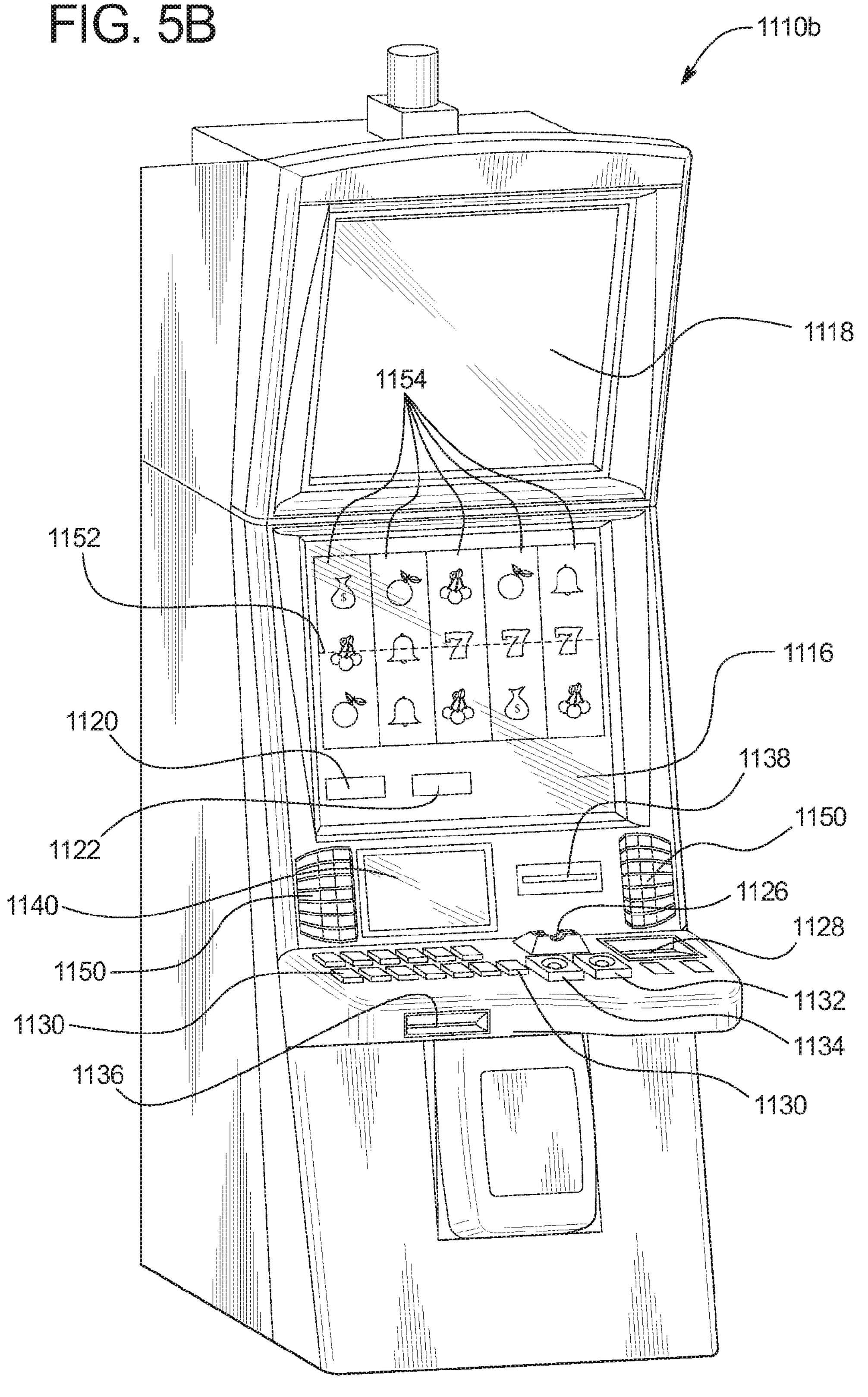

In various embodiments, the EGM includes one or more input devices. The input devices may include any suitable device that enables an input signal to be produced and received by the at least one processor of the EGM. The example EGM illustrated in FIG. 4B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 5A and 5B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 5A and 5B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 5A and 5B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 5A and 5B each include a card reader 1138. The card reader is configured to read a player identification card inserted into the card reader.

In various embodiments, the EGM includes one or more output devices. The example EGM illustrated in FIG. 4B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 5A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 5A and 5B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 5A and 5B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 5A and 5B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 5A and 5B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award or payout to be obtained addition to any award or payout obtained through play of the primary game (s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing and including an acceptor;

at least one processor; and at least one memory device that stores a plurality of instructions that, when executed by the at least one processor, cause the at least one processor to operate with the plurality of input devices and the at least one display device to:

(a) establish a credit balance based at least in part on a monetary value associated with a physical item responsive to receipt of the physical item by the acceptor;

(b) place at least one wager for a play of a game responsive to receipt of an actuation of a wager button, the credit balance decreasable by the at least one wager;

(c) display an initial quantity of active player hands, each active player hand including at least two cards, each card having a suit and a rank, the rank and the suit of each of the cards in the initial quantity of active player hands being visible;

(d) enable one or more active player hands from the initial quantity of active player hands to be folded, thereby leaving a quantity of active player hands;

(e) display a rank and a suit of each of a first quantity of community cards;

(f) enable one or more active player hands from the quantity of active player hands to be folded;

(g) display a rank and a suit of each of a second quantity of community cards;

(h) for each active player hand in the quantity of active player hands, determine any award based at least in part on cards in that active player hand, the first quantity of community cards, and the second quantity of community cards, the credit balance increasable by any determined award; and (i) initiate a payout associated with the credit balance responsive to receipt of an actuation of a cashout button.

2. The gaming system of claim 1, wherein the initial quantity of active player hands is at least four.

3. The gaming system of claim 1, wherein the plurality of instructions, when executed by the at least one processor, cause the at least one processor to operate with the wager button to enable the player to place another wager after (e) and before (f).

4. The gaming system of claim 1, wherein the plurality of instructions, when executed by the at least one processor, cause the at least one processor to operate with the wager button to enable the player to place another wager after (g) and before (h).

5. The gaming system of claim 1, wherein the first quantity of community cards is at least three.

6. The gaming system of claim 1, wherein the second quantity of community cards is one.

7. The gaming system of claim 1, wherein the plurality of instructions, when executed by the at least one processor, cause the at least one processor to provide (d) before (e).

8. The gaming system of claim 1, wherein the plurality of instructions, when executed by the at least one processor, cause the at least one processor to provide (e) before (d).

9. The gaming system of claim 1, wherein the plurality of instructions, when executed by the at least one processor, cause the at least one processor to operate with the at least one display device to display the rank and the suit of each of a third quantity of community cards.

10. The gaming system of claim 9, wherein a sum of the first quantity of community cards, the second quantity of community cards, and the third quantity of community cards is at least five.

11. The gaming system of claim 9, wherein the third quantity of community cards is one.

12. The gaming system of claim 1, wherein the plurality of instructions, when executed by the at least one processor, cause the at least one processor to, for each stage including the display of at least one community card, provide (d) before displaying the at least one community card.

13. The gaming system of claim 1, wherein the plurality of instructions, when executed by the at least one processor, cause the at least one processor to, for each stage including the display of at least one community card, provide (d) after displaying the at least one community card.

14. The gaming system of claim 1, wherein the plurality of instructions, when executed by the at least one processor, cause the at least one processor to operate with the at least one display device to, for a first stage, display face-up a first quantity of one or more community cards and, for a second stage, display face-up a second quantity of one or more community cards, the first and second quantities being different.

15. The gaming system of claim 1, wherein the initial quantity of player hands exceeds a total quantity of stages.

16. The gaming system of claim 1, wherein the plurality of instructions, when executed by the at least one processor, cause the at least one processor to, after completion of the plurality of stages and before determining any awards, operate with the at least one display device to display at least one additional community card.

17. The gaming system of claim 16, wherein the plurality of stages includes a first stage, a second stage, and a third stage and the initial quantity of player hands is equal to four.

18. The gaming system of claim 17, wherein the plurality of instructions, when executed by the at least one processor, cause the at least one processor to operate with the at least one display device to display face-up three community cards for the second stage and one community card for the third stage.

19. The gaming system of claim 18, wherein the plurality of instructions, when executed by the at least one processor, cause the at least one processor to, after completion of the first, second, and third stages, operate with the at least one display device to display face-up one community card and determine any awards for each unfolded player hand based on the five community cards and that unfolded player hand.

20. A gaming system comprising:

a housing;

at least one display device supported by the housing;

a plurality of input devices supported by the housing and including an acceptor;

at least one processor; and at least one memory device that stores a plurality of instructions that, when executed by the at least one processor, cause the at least one processor to operate with the plurality of input devices and the at least one display device to:

(a) establish a credit balance based at least in part on a monetary value associated with a physical item responsive to receipt of the physical item by the acceptor;

(b) place a wager responsive to receipt of an actuation of a wager button, the credit balance decreasable by the wager;

(c) display face-up an initial quantity of a plurality of player hands to the player, each player hand including one or more cards;

(d) for each of a plurality of stages, enable the player to fold one of the player hands and, if a player fold input associated with one of the player hands is received, fold that player hand;

(e) for each of one or more of the plurality of stages, display face-up at least one community card;

(f) after completion of the plurality of stages, for each unfolded player hand, determine any award for that unfolded player hand based on the one or more cards of that unfolded player hand and the community cards, the credit balance increasable by any determined awards; and (g) initiate a payout associated with the credit balance responsive to receipt of an actuation of a cashout button.

* * * * *